United States Patent
Zhang et al.

(10) Patent No.: US 12,058,279 B2
(45) Date of Patent: *Aug. 6, 2024

(54) CONTROL METHOD OF ELECTRONIC DEVICE AND ELECTRONIC DEVICE

(71) Applicant: GUANGDONG OPPO MOBILE TELECOMMUNICATIONS CORP., LTD., Guangdong (CN)

(72) Inventors: Xueyong Zhang, Guangdong (CN); Xiangnan Lyu, Guangdong (CN); Bin Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 342 days.

This patent is subject to a terminal disclaimer.

(21) Appl. No.: 17/537,352

(22) Filed: Nov. 29, 2021

(65) Prior Publication Data
US 2022/0086266 A1   Mar. 17, 2022

Related U.S. Application Data

(63) Continuation of application No. PCT/CN2020/085973, filed on Apr. 21, 2020.

(30) Foreign Application Priority Data

May 31, 2019   (CN) .......................... 201910471662.X

(51) Int. Cl.
 H04M 1/02   (2006.01)
 G06F 3/044   (2006.01)
 G06T 7/55   (2017.01)

(52) U.S. Cl.
 CPC .......... *H04M 1/0266* (2013.01); *G06F 3/044* (2013.01); *G06T 7/55* (2017.01); *H04M 1/0214* (2013.01);
(Continued)

(58) Field of Classification Search
 CPC ...... G06F 1/1626; G06F 1/1684; G06F 3/044; G06T 2207/10028; G06T 7/521;
(Continued)

(56) References Cited

U.S. PATENT DOCUMENTS

2008/0194290 A1   8/2008  Lebert et al.
2009/0322745 A1   12/2009  Zhang et al.
(Continued)

FOREIGN PATENT DOCUMENTS

CN   204031223 U   12/2014
CN   105763803 A   7/2016
(Continued)

OTHER PUBLICATIONS

Chinese First Office Action with English Translation for CN Application 201910471662.X mailed Jan. 27, 2021. (16 pages).
(Continued)

*Primary Examiner* — Tan H Trinh
(74) *Attorney, Agent, or Firm* — Young Basile Hanlon & MacFarlane, P.C.

(57) ABSTRACT

An electronic device and a control method of the electronic device. The control method comprises: determining a use state of an electronic device; when the electronic device is in a first use state, a laser projector projecting laser light in a first mode; and when the electronic device is in a second use state, the laser projector projecting laser light in a second mode, the energy of the laser light projected in the second mode is greater than the energy of the laser light projected in the first mode.

20 Claims, 19 Drawing Sheets

(52) U.S. Cl.
CPC . *H04M 1/0241* (2013.01); *G06T 2207/10028* (2013.01); *H04M 2250/12* (2013.01); *H04M 2250/16* (2013.01); *H04M 2250/54* (2013.01)

(58) Field of Classification Search
CPC ..... G06T 7/55; H04M 1/0214; H04M 1/0241; H04M 1/0266; H04M 1/0272; H04M 1/72454; H04M 2250/12; H04M 2250/16; H04M 2250/54
USPC ........................................................ 455/566
See application file for complete search history.

(56) References Cited

U.S. PATENT DOCUMENTS

| | | | |
|---|---|---|---|
| 2011/0117958 | A1 | 5/2011 | Kim et al. |
| 2011/0286170 | A1* | 11/2011 | Liu ...................... G06F 1/1686 361/679.4 |
| 2014/0128132 | A1 | 5/2014 | Cox, III |
| 2015/0015797 | A1* | 1/2015 | Garlington .......... G02B 3/0006 348/789 |
| 2015/0347833 | A1 | 12/2015 | Robinson et al. |
| 2016/0165023 | A1 | 6/2016 | Song |
| 2017/0075092 | A1 | 3/2017 | Kim et al. |
| 2017/0148376 | A1 | 5/2017 | Yoo et al. |
| 2018/0312111 | A1* | 11/2018 | Bongwald ................ B60R 1/00 |
| 2019/0317216 | A1* | 10/2019 | Zhang .................... G03B 17/54 |
| 2020/0386540 | A1* | 12/2020 | Hseih ................... G01S 7/4915 |
| 2021/0293556 | A1* | 9/2021 | Suzuki ............... G01C 21/3438 |
| 2022/0082661 | A1* | 3/2022 | Zhang ...................... G06T 7/55 |

FOREIGN PATENT DOCUMENTS

| | | |
|---|---|---|
| CN | 106534651 A | 3/2017 |
| CN | 106686321 A | 5/2017 |
| CN | 107743156 A | 2/2018 |
| CN | 107862853 A | 3/2018 |
| CN | 107896274 A | 4/2018 |
| CN | 107948363 A | 4/2018 |
| CN | 107968910 A | 4/2018 |
| CN | 207283612 U | 4/2018 |
| CN | 108055370 A | 5/2018 |
| CN | 108594451 A | 9/2018 |
| CN | 108683795 A | 10/2018 |
| CN | 108833693 A | 11/2018 |
| CN | 109066288 A | 12/2018 |
| CN | 109167855 A | 1/2019 |
| CN | 109192153 A | 1/2019 |
| CN | 208445604 U | 1/2019 |
| CN | 109324633 A | 2/2019 |
| CN | 109327576 A | 2/2019 |
| CN | 109391713 A | 2/2019 |
| CN | 208522805 U | 2/2019 |
| CN | 109451106 A | 3/2019 |
| CN | 109495617 A | 3/2019 |
| CN | 109587295 A | 4/2019 |
| CN | 109710150 A | 5/2019 |
| CN | 110213413 A | 9/2019 |
| CN | 209676289 U | 11/2019 |
| EP | 2178276 A2 | 4/2010 |
| EP | 2316213 A1 | 5/2011 |
| JP | 2006245799 A | 9/2006 |
| JP | 2013513179 A | 4/2013 |
| KR | 20080004546 A | 1/2008 |
| WO | 2016157601 A1 | 10/2016 |

OTHER PUBLICATIONS

International Search Report with English Translation for CN Application PCT/CN2020/085973 mailed Jul. 8, 2020. (19 pages).
Extended European Search Report for EP Application 20814207.5 mailed Jun. 1, 2022. (9 pages).
Chinese Notice of first review opinion with English Translation for CN Application 202111107307.8 mailed Dec. 7, 2023. (17 pages).
International Search Report with English translation for PCT application PCT/CN2020/085819 mailed on Jul. 22, 2020, 17 pages.
Chinese Office Action with English translation for CN application 201910472716.4, mailed Jan. 27, 2021, 16 pages.
Extended European Search Report for EP application 20813039.3, mailed Jun. 1, 2022, 9 pages.
Indian Office Action for IN application 202117055809, mailed Jun. 16, 2022, 6 pages.
Japanese Notice of Reasons for Refusal with English translation for JP application 2021-571488, mailed Nov. 4, 2022, 10 pages.
Korean Office Action with English translation for KR application 10-2021-7039467, mailed Feb. 17, 2023, 16 pages.
Japanese Second Office Action with English translation for JP application 2021-571488, mailed Apr. 4, 2023, 10 pages.

* cited by examiner

CONTROL METHOD OF ELECTRONIC DEVICE AND ELECTRONIC DEVICE

CROSS-REFERENCE TO RELATED APPLICATION(S)

This application is a continuation application of International Application No. PCT/CN2020/085973, filed Apr. 21, 2020, which claims priority to and benefits of Chinese Patent Application No. 201910471662.X, the entire contents of both of which are incorporated herein by reference.

TECHNICAL FIELD

The present disclosure relates to the technical field of consumer electronics, and more particularly to a controlling method for an electronic device and an electronic device.

BACKGROUND

In an existing mobile phone with a laser projector, the laser projector is generally disposed at a front shell of the mobile phone, and the laser projector is only used in a front usage state to shoot a closer object in distance. For example, the laser projector is only used in the front usage state to acquire a depth image. Therefore, the laser projector can only be used in fewer scenes.

SUMMARY

Embodiments of the present disclosure provide a controlling method for an electronic device and an electronic device.

Embodiments of the present disclosure provide a controlling method for an electronic device. The electronic device includes a shell, a first display screen, a second display screen and a laser projector, the shell includes a first surface and a second surface opposite to each other, the first display screen and the second display screen are disposed on the first surface and the second surface, respectively, and the laser projector is disposed at the first surface. The controlling method includes: projecting a laser in a first mode by the laser projector when the electronic device is in a first usage state; and projecting a laser in a second mode by the laser projector when the electronic device is in a second usage state, and the laser projected in the second mode has a greater energy than that of the laser projected in the first mode.

Embodiments of the present disclosure provide an electronic device, which includes: a shell, a first display screen, a second display screen, a laser projector and a processor. The shell includes a first surface and a second surface opposite to each other, the first display screen and the second display screen are disposed on the first surface and the second surface, respectively, and the laser projector is disposed at the first surface. The processor is configured to determine a usage state of the electronic device. The laser projector is configured to project a laser in a first mode when the electronic device is in a first usage state and project a laser in a second mode when the electronic device is in a second usage state, and the laser projected in the second mode has a greater energy than that of the laser projected in the first mode.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

These and/or other aspects and advantages of embodiments of the present disclosure will become apparent and more readily appreciated from the following descriptions made with reference to the drawings, in which.

DETAILED DESCRIPTION

Figure 1:
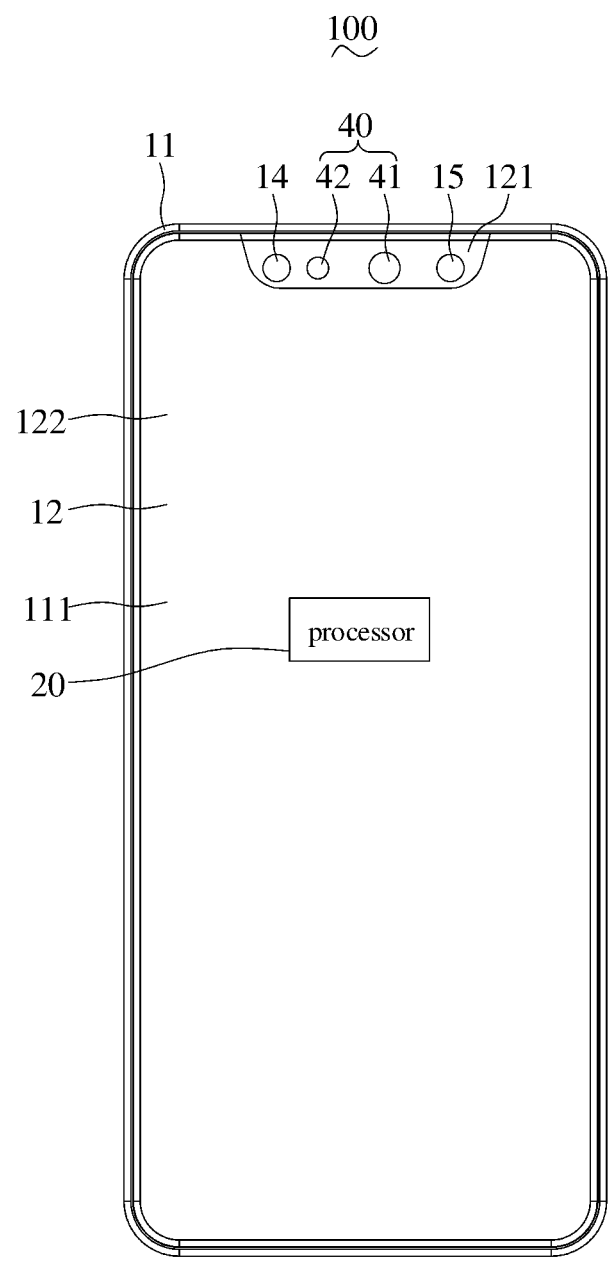
FIG. 1 is a schematic diagram of an electronic device according to some embodiments of the present disclosure.

Embodiments of the present disclosure will be described in detail below, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are only used to generally understand the present disclosure, but shall not be construed to limit the present disclosure.

Figure 2:
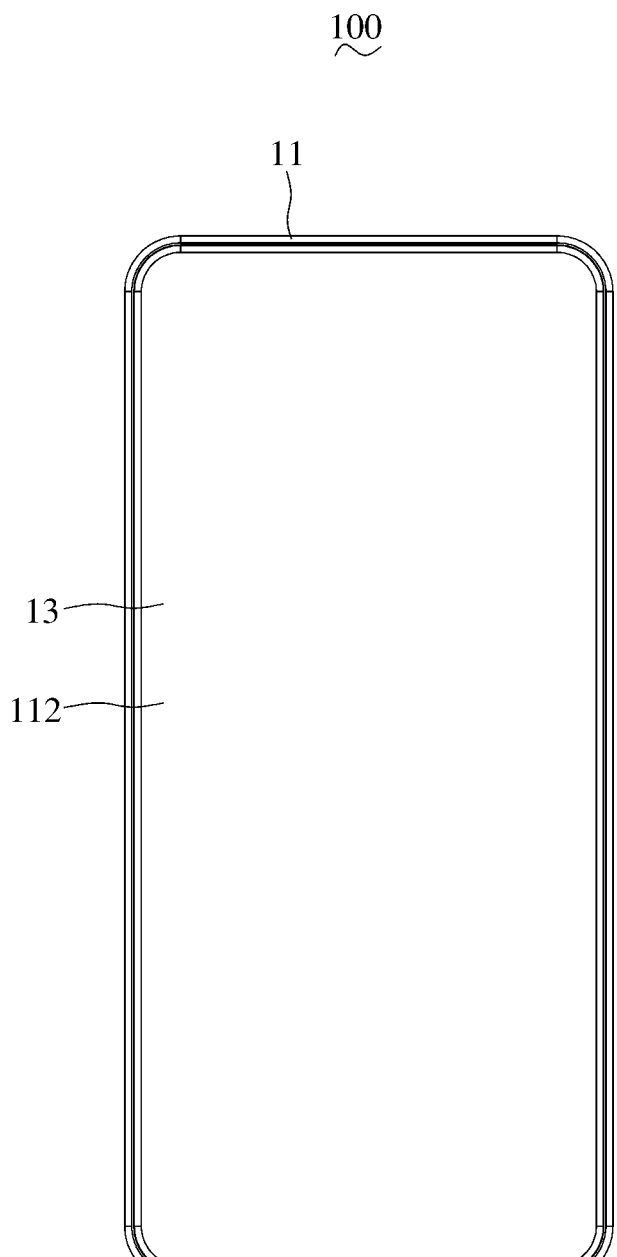
FIG. 2 is a schematic diagram of an electronic device according to some embodiments of the present disclosure.
Figure 3:
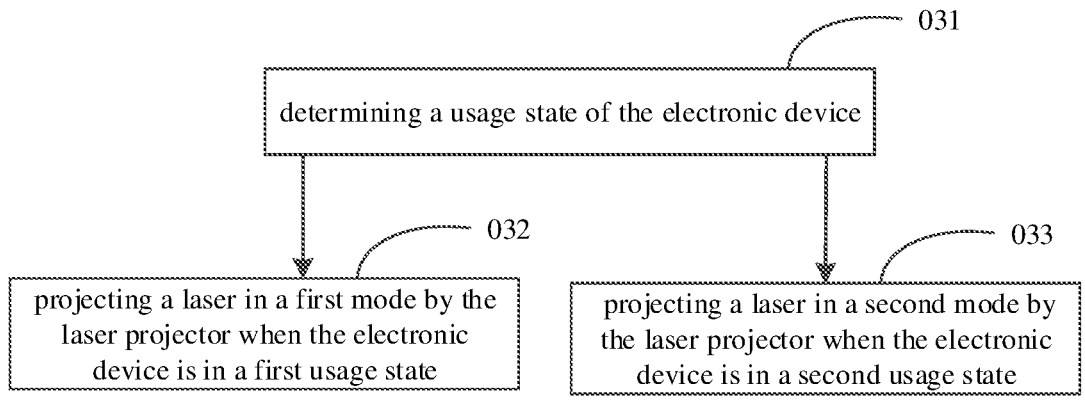
FIG. 3 is a schematic flow chart of a controlling method for an electronic device according to some embodiments of the present disclosure.

As illustrated in FIG. 1 to FIG. 3, a controlling method for an electronic device 100 according to the present disclosure is applicable to the electronic device 100. The electronic device 100 includes a shell 11, a first display screen 12, a second display screen 13 and a laser projector 14. The shell 11 includes a first surface 111 and a second surface 112 opposite to each other. The first display screen 12 and the second display screen 13 are disposed on the first surface 111 and the second surface 112, respectively. The laser projector 14 is disposed at the first surface 111. The controlling method includes:

031, determining a usage state of the electronic device 100;

032, projecting a laser in a first mode by the laser projector 14 when the electronic device 100 is in a first usage state; and 033, projecting a laser in a second mode by the laser projector 14 when the electronic device 100 is in a second usage state, the laser projected in the second mode having a greater energy than that of the laser projected in the first mode.

Figure 5:
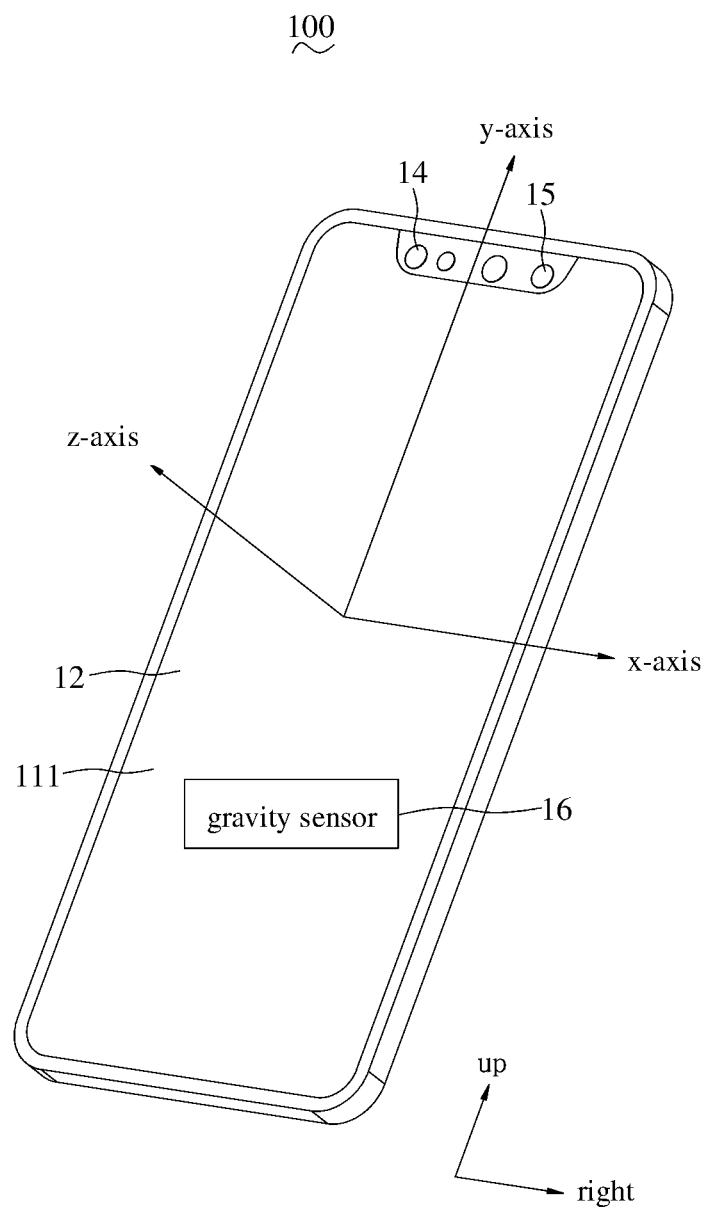
FIG. 5 is a schematic perspective diagram of an electronic device according to some embodiments of the present disclosure.

As illustrated in FIG. 5, in some embodiments, the electronic device 100 further includes a gravity sensor 16, the determining (031) the usage state of the electronic device includes: determining the usage state of the electronic device 100 by the gravity sensor 16.

As illustrated in FIG. 5, in some embodiments, the determining the use state of the electronic device 100 by the gravity sensor 16 includes:

0611, acquiring a z-axis acceleration component of the gravity sensor 16;

0612, determining that the electronic device 100 is in the first usage state when the z-axis acceleration component is greater than a first preset value; and 0613, determining that the electronic device 100 is in the second usage state when the z-axis acceleration component is less than a second preset value.

In some embodiments, the determining (031) the usage state of the electronic device 100 includes: determining the usage state of the electronic device according to detection of the first touch signal by the first display screen 12 and/or detection of the second touch signal by the second display screen 13.

In some embodiments, the determining the usage state of the electronic device 100 according to the detection of the first touch signal by the first display screen 12 and/or the detection of the second touch signal by the second display screen 13 includes:

0711, determining that the electronic device 100 is in the first usage state when the first touch signal is detected by the first display screen 12; and 0712, determining that the electronic device 100 is in the second usage state when the second touch signal is detected by the second display screen 13.

In some embodiments, the electronic device 100 further includes a state selection key 17, and the determining (031) the usage state of the electronic device 100 includes: determining the usage state of the electronic device 100 through the state selection key.

In some embodiments, a power of the laser projector 14 for projecting the laser in the first mode is less than that of the laser projector 14 for projecting the laser in the second mode.

The laser projector 14 includes a plurality of point light sources 141 each controlled independently; and the number of the point light sources 141 turned on by the laser projector 14 in the first mode is less than that of the point light sources 141 turned on by the laser projector 14 in the second mode.

In some embodiments, electronic device 100 further includes an image collector 15, image collector 15 disposed at the first surface; and when the laser projector 14 projects a laser, the laser projector 14 projects the laser at a first operating frequency to a scene; and the controlling method further includes:
acquiring collection images by the image collector 15 at a second operating frequency, the second operating frequency being greater than first operating frequency;
distinguishing, among the collection images, a first image collected when the laser projector 14 does not project the laser from a second image collected when the laser projector 14 projects the laser; and
calculating a depth image according to the first image, the second image and a reference image.

As illustrated in FIG. 1, an electronic device 100 according to embodiments of the present disclosure includes a shell 11, a first display screen 12, a second display screen 13, a laser projector 14 and a processor 20. The shell 11 includes a first surface 111 and a second surface 112 opposite to each other, and the first display screen 12 and the second display screen 13 are disposed on the first surface 111 and the second surface 112, respectively. The laser projector 14 is disposed at the first surface 111. The processor 20 is configured to determine a usage state of the electronic device 100. The laser projector 14 is configured to project a laser in a first mode when the electronic device 100 is in a first usage state and project a laser in a second mode when the electronic device 100 is in a second usage state. The laser projected in the second mode has a greater energy than that of the laser projected in the first mode.

As illustrated in FIG. 5, in some embodiments, the electronic device 100 further includes a gravity sensor 16. The processor 20 is configured to determine the usage state of the electronic device 100 by the gravity sensor 16.

As illustrated in FIG. 5, in some embodiments, the processor 20 is further configured to:

acquire a z-axis acceleration component of the gravity sensor 16;

determine that the electronic device 100 is in the first usage state when the z-axis acceleration component is greater than a first preset value; and determine that the electronic device 100 is in the second usage state when the z-axis acceleration component is less than a second preset value.

As illustrated in FIG. 1, in some embodiments, the processor 20 is configured to determine the usage state of the electronic device 100 according to detection of the first touch signal by the first display screen 12 and/or detection of the second touch signal by the second display screen 13.

As illustrated in FIG. 1, in some embodiments, the processor 20 is configured to:
determine that the electronic device 100 is in the first usage state when the first touch signal is detected by the first display screen 12; and
determine that the electronic device 100 is in the second usage state when the second touch signal is detected by the second display screen 13.

Figure 8:
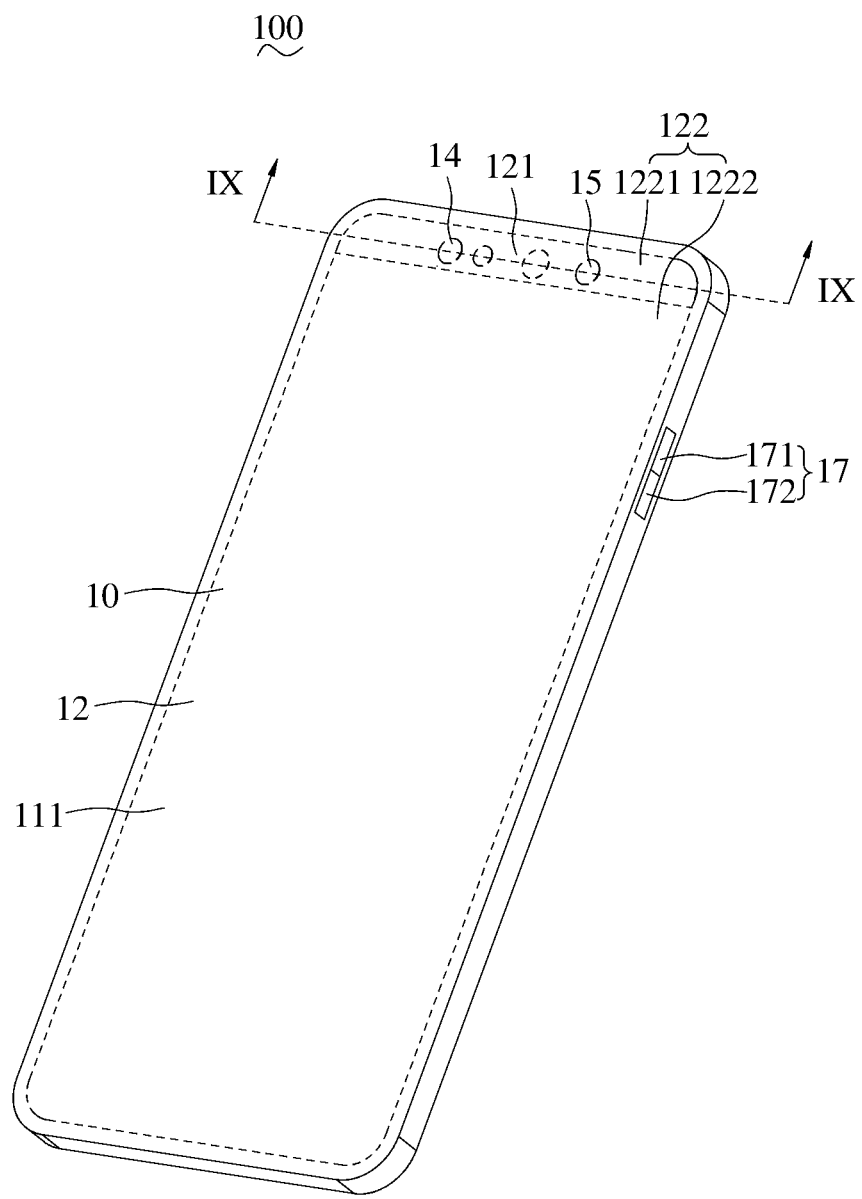
FIG. 8 is a schematic perspective diagram of an electronic device according to some embodiments of the present disclosure.

As illustrated in FIG. 8, in some embodiments, electronic device 100 further includes a state selection key 17. The processor 20 is configured to determine the usage state of the electronic device 100 through the state selection key 17.

Figure 4:
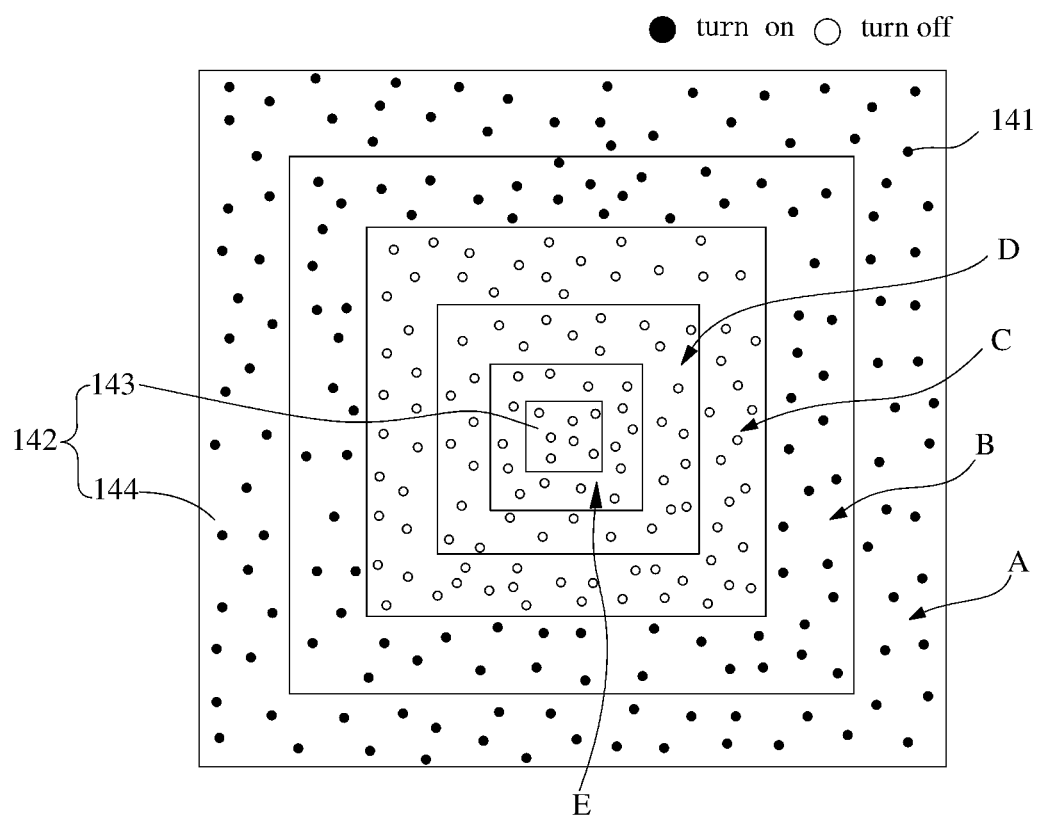
FIG. 4 is a schematic diagram of a laser source of a laser projector in an electronic device according to some embodiments of the present disclosure.

As illustrated in FIG. 4, in some embodiments, the power of the laser projector 14 for projecting the laser in the first mode is less than that of the laser projector 14 for projecting the laser in the second mode; and/or the laser projector 14 includes a plurality of point light sources 141 each controlled independently; and the number of the point light sources 141 turned on by the laser projector 14 in the first mode is less than that of the point light sources 141 turned on by the laser projector 14 in the second mode.

As illustrated in FIG. 4, in some embodiments, the plurality of the point light sources 141 form a plurality of light emitting arrays 142 arranged in an annular shape.

As illustrated in FIG. 1, in some embodiments, the electronic device 100 further includes an image collector 15. The image collector 15 is disposed at the first surface 111. The laser projector 14 is configured to project a laser at a first operating frequency to a scene when the laser projector 14 projects the laser; the image collector 15 is configured to acquire collection images at a second operating frequency, and the second operating frequency is greater than first operating frequency; and the processor 20 is further configured to distinguish, among the collection images, a first image collected when the laser projector 14 does not project the laser from a second image collected when the laser projector 14 projects the laser; and to calculate a depth image according to the first image, the second image and a reference image.

As illustrated in FIG. 1, in some embodiments, first display screen 12 has an opening at an end thereof, the second display screen 13 is a full screen, and the laser projector 14 is installed in the opening; or the first display screen 12 and the second display screen 13 are both a full screen, and the laser projector 14 is disposed below the first display screen 12.

As illustrated in FIG. 1, in some embodiments, an orientation of the laser projector 14 in the first usage state is opposite to that of the laser projector 14 in the second usage state.

In some embodiments, the first touch signal and the second touch signal are both capacitive signals.

As illustrated in FIG. 1 to FIG. 3, the present disclosure provides a controlling method for an electronic device 100. The electronic device 100 includes a shell 11, a first display screen 12, a second display screen 13 and a laser projector 14. The shell 11 includes a first surface 111 and a second surface 112 opposite to each other. The first display screen 12 and the second display screen 13 are disposed on the first surface 111 and the second surface 112, respectively. The laser projector 14 is disposed at the first surface 111. The controlling method includes:

031, determining a usage state of the electronic device 100;

032, projecting a laser in a first mode by the laser projector 14 when the electronic device 100 is in a first usage state; and 033, projecting a laser in a second mode by the laser projector 14 when the electronic device 100 is in a second usage state, the laser projected in the second mode having a greater energy than that of the laser projected in the first mode.

The electronic device 100 of the present disclosure may be used to implement the aforementioned controlling method. Specifically, the electronic device 100 further includes a processor 20, the step 031 may be implemented by the processor 20, and the steps 032 and 033 may be implemented by the laser projector 14. In other words, the processor 20 may be configured to determine the usage state of the electronic device 100, and the laser projector 14 may be configured to project the laser in the first mode when the electronic device 100 is in the first usage state, and to project the laser in the second mode when the electronic device 100 is in the second usage state.

The electronic device 100 may be a mobile phone, a tablet computer, a laptop computer, a smart wearable device (such as a smart watch, a smart bracelet, a smart helmet, smart glasses, etc.), a virtual reality device, and the like. The present disclosure will be illustrated by taking a mobile phone as an example of the electronic device 100, but the form of the electronic device 100 is not limited to a mobile phone.

The electronic device 100 further includes an image collector 15 disposed at the first surface 111, and the image collector 15 is used in cooperation with the laser projector 14 to obtain depth information of an object to be measured, which may be used for three-dimensional modeling to generate a three-dimensional image or used for distance measurement. The laser projector 14 and the image collector 15 may be installed on a bracket, and then the bracket, the laser projector 14 and the image collector 15 are installed in the shell 11 together.

In embodiments of the present disclosure, the usage state of the electronic device 100 includes the first usage state and the second usage state. Relative to a user of the electronic device 100, an orientation of the laser projector 14 in the first usage state is opposite to that of the laser projector 14 in the second usage state. The first usage state may be a front usage state, and when the electronic device 100 is in the front usage state, the first display screen 12 and the laser projector 14 face the user of the electronic device 100. In this case, the user is able to see the content displayed on the first display screen 12 and use the laser projector 14 to project a laser towards a side where the user is located, such that the user may use the laser projector 14 (and the image collector 15) to perform face recognition, iris recognition, and the like. The second usage state may be a rear usage state, and when the electronic device 100 is in the rear usage state, the first display screen 12 and the laser projector 14 are away from the user of the electronic device 100, and the second display screen 13 faces the user of the electronic device 100. In this case, the user is able to see the content displayed on the second display screen 13 and use the laser projector 14 to project a laser towards a side away from the user. For example, the user may use the laser projector 14 (and the image collector 15) to acquire a depth image of an object to be measured at a side of the electronic device 100 away from the user.

In embodiments of the present disclosure, the laser projector 14 may be in the first mode or the second mode to project a laser, the first mode corresponds to a case that the laser projector 14 is in the front usage state, the second mode corresponds to a case that the laser projector 14 is in the rear usage state, and the energy of the laser projected in the second mode is greater than that of the laser projected in the first mode. Specifically, the power of the laser projector 14 for projecting the laser in the first mode may be less than that of the laser projector 14 for projecting the laser in the second mode, so that the energy of the laser projected in the second mode is greater than that of the laser projected in the first mode, and in this case, a maximum distance (i.e., a projection distance) reachable by the laser projected by the laser projector 14 in the second mode is greater than a maximum distance (i.e., a projection distance) reachable by the laser projected by the laser projector 14 in the first mode. At the same time, a rear distance range detectable by the image collector 15 in cooperation with the laser projector 14 in the rear usage state is greater than a front distance range detectable by the image collector 15 in cooperation with the laser projector 14 in the front usage state. For example, the front distance range detectable by the image collector 15 in cooperation with the laser projector 14 is within 25 cm, while the rear distance range detectable by the image collector 15 in cooperation with the laser projector 14 is greater than 25 cm (an accuracy within the distance range of 25 cm is very poor). Alternatively, the front distance range slightly overlaps the rear distance range, for example, the front distance range detectable by the image collector 15 in cooperation with the laser projector 14 is within 25 cm, while the rear distance range detectable by the image collector 15 in cooperation with the laser projector 14 is greater than 20 cm.

In the electronic device 100 and the controlling method for the electronic device 100 according to the present disclosure, the first display screen 12 and the second display screen 13 are disposed at opposite sides of the shell 11, respectively, the laser projector 14 and the first display screen 12 are disposed at the same side of the shell 11, and a maximum distance projectable by the laser projector 14 in the second usage state is greater than that projectable by the laser projector 14 in the first usage state, so that the laser projector 14 is usable in both the first usage state and the second usage state, which increases the scenes where the electronic device 100 can be used by the user; at the same time, there is no need to provide two laser projectors 14 on the electronic device 100 for the first usage state and the second usage state, respectively, thereby saving the cost of the electronic device.

As illustrated in FIG. 4, in some embodiments, the laser projector 14 includes a laser source 140, the laser source 140 includes a plurality of point light sources 141 each controlled independently. Specifically, each point light source 141 can be turned on and off independently. The number of point light sources 141 turned on by the laser projector 14 in the first mode is less than that of point light sources 141 turned on by the laser projector 14 in the second mode, and the power of each point light source 141 for projecting the laser may be the same, so that the energy of the laser projected in the second mode is greater than that of the laser projected in the first mode, and the maximum distance reachable by the laser projected by the laser projector 14 in the second mode is greater than that reachable by the laser projected by the laser projector 14 in the first mode.

As illustrated in FIG. 4, in some embodiments, the plurality of the point light sources 141 form a plurality of light emitting arrays 142, and the plurality of the light emitting arrays 142 are each controlled independently. Specifically, the multiple point light sources 141 in each light emitting array 142 can be turned on or off at the same time, and the power of the multiple point light sources 141 in each light emitting array 142 may be the same. In other embodiments, the multiple point light sources 141 in each light emitting array 142 may also be controlled independently.

In some embodiments, the plurality of the light emitting arrays 142 are arranged in an annular shape. The lasers emitted by the point light sources 141 in the light emitting array 142 arranged in the annular shape can cover a wider field of view, so that more depth information of the object to be measured can be obtained. Among others, the annular shape may be a square annular shape or a circular annular shape.

As illustrated in FIG. 4, in some embodiments, as the projection distance increases, the light emitting arrays 142 are turned on in a manner that the farther a light emitting array 142 is away from a center of the laser source 140, the earlier the light emitting array 142 is turned on. For example, as illustrated in FIG. 4, there are six light emitting arrays 142 in total, including five annular sub-arrays 144 and one square sub-array 143. In a direction from a periphery of the laser source 140 to the center of the laser source 140, the five annular sub-arrays 144 are arranged in sequence, which are marked as A, B, C, D, and E. In some embodiments, when the laser projector 14 is in the first mode, the point light sources 141 in the annular sub-arrays 144 marked as A and B may be turned on; when the laser projector 14 is in the second mode, the point light sources 141 in the annular sub-arrays 144 marked as A, B and C may be turned on, or the point light sources 141 in the annular sub-arrays 144 marked as A, B, C and D may be turned on, or the point light sources 141 in the annular sub-arrays 144 marked as A, B, C, D and E may be turned on, or the point light sources 141 in the annular sub-arrays 144 marked as A, B, C, D and E and the point light sources 141 in the square sub-array 143 may be turned on.

In some embodiments, the number of the point light sources 141 turned on when the laser projector 14 is in the first mode is less than that of the point light sources 141 turned on when the laser projector 14 is in the second mode, so that the energy of the laser projected when the electronic device 100 is in first usage state is less than that of the laser projected when the electronic device 100 is in second usage state.

Figure 9:
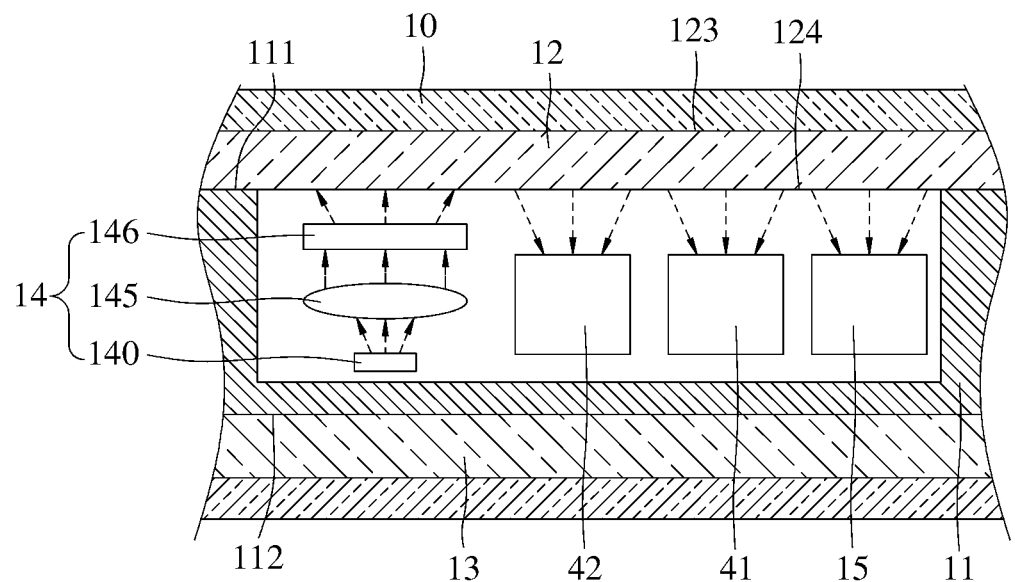
FIG. 9 is a sectional view of the electronic device shown in FIG. 8 along an IX-IX line.

It will be understood that a diffractive optical element 146 (as illustrated in FIG. 9) of the laser projector 14 has a limited diffraction ability, that is, a part of the lasers emitted by the laser source 140 is not diffracted by the diffractive optical element 146 but is directly emitted. The laser emitted directly has a larger energy, which is very likely to harm the user's eyes. Therefore, the laser projector 14 projects the laser in the first mode when the electronic device 100 is in the first usage state, that is, the laser projector 14 first turns on the annular sub-array 144 away from the center of the laser source 140 when the projection distance is smaller, which can avoid that the laser projected by the laser source 140 is directly projected to the user's eyes without undergoing the diffraction attenuation effect of the diffractive optical element 146, thereby improving the security of the laser projector 14; and the laser projector 14 projects the laser in the second mode when the electronic device 100 is in the second usage state, that is, the laser projector 14 simultaneously turns on the annular sub-array 144 away from the center of the laser source 140 and the annular sub-array 144 near the center of the laser source 140 when the projection distance is larger, so as to increase the maximum distance that the lasers projected by the laser projector 14 can reach.

Figure 6:
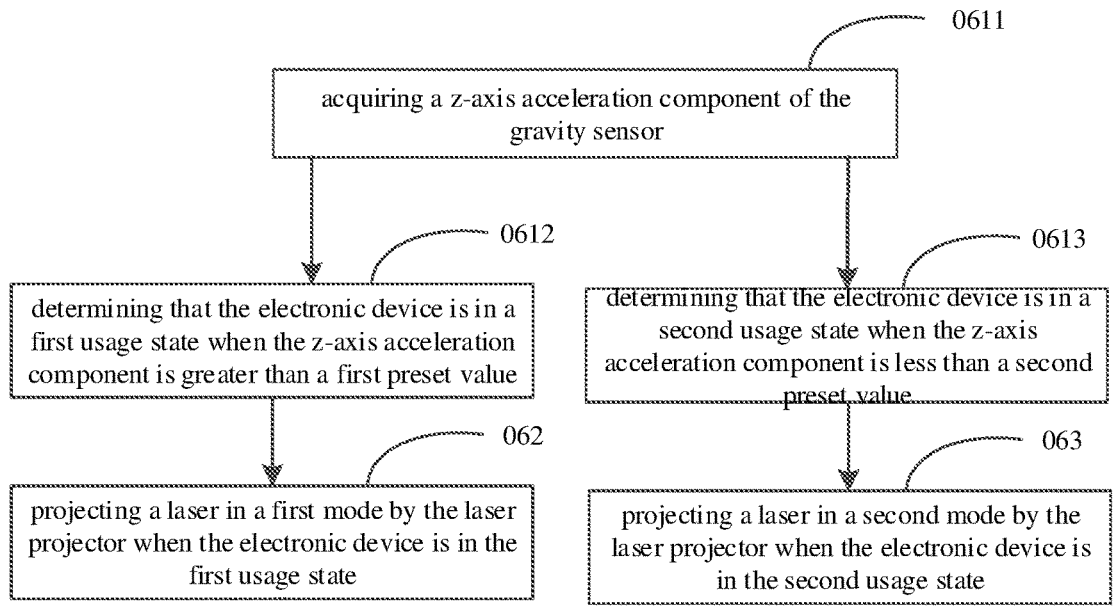
FIG. 6 is a schematic flow chart of a controlling method for an electronic device according to some embodiments of the present disclosure.

As illustrated in FIG. 5 and FIG. 6, in some embodiments, the electronic device 100 further includes a gravity sensor 16. The determination of the usage state of the electronic device 100 may be achieved through the gravity sensor 16. Specifically, the controlling method includes:

0611, acquiring a z-axis acceleration component of the gravity sensor 16;

0612, determining that the electronic device 100 is in a first usage state when the z-axis acceleration component is greater than a first preset value;

0613, determining that the electronic device 100 is in a second usage state when the z-axis acceleration component is less than a second preset value;

062, projecting a laser in a first mode by the laser projector 14 when the electronic device 100 is in the first usage state; and

063, projecting a laser in a second mode by the laser projector 14 when the electronic device 100 is in the second usage state, the energy of the laser projected in the second mode being greater than that of the laser projected in the first mode.

The above controlling method may also be implemented by the electronic device 100, the steps 0611, 0612 and 0613 may be sub-steps of the step 031 as described hereinbefore, the step 062 is basically the same as the step 032 described hereinbefore, and the step 063 is basically the same as the step 033 described hereinbefore. Specifically, the processor 20 is electrically connected to the gravity sensor 16, the processor 20 may be further configured to determine the usage state of the electronic device 100 through the gravity sensor 16, and the processor 20 may be further configured to implement the steps 0611, 0612 and 0613. In other words, the processor 20 may be further configured to acquire the z-axis acceleration component of the gravity sensor 16, determine that the electronic device 100 is in the first usage state when the z-axis acceleration component is greater than the first preset value, and determine that the electronic device 100 is in the second usage state when the z-axis acceleration component is less than the second preset value.

In some embodiments, the gravity sensor 16 includes a three-axis acceleration sensor 16. As illustrated in FIG. 5, which is a schematic diagram illustrating a principle of determining the usage state of the electronic device 100 by the three-axis acceleration sensor 16. As illustrated in FIG. 5, an x-axis, a y-axis and a z-axis are all relative to the position of the shell 11. Generally, a y-axis direction is an upward direction of the shell 11, an x-axis direction is a rightward direction of the shell 11, and a z-axis direction is an outward direction perpendicular to the first surface 111. The z-axis acceleration component (i.e., an acceleration value) corresponds to the orientation of the first display screen 12.

Viewing from a perspective that the user uses the electronic device 100 (such as a mobile phone), when the electronic device 100 is placed flat on a desktop with the first display screen 12 facing up, an x-axis acceleration component of the gravity sensor defaults to 0, a y-axis acceleration component of the gravity sensor defaults to 0, and the z-axis acceleration component of the gravity sensor defaults to 9.81 m/s$^2$; when the electronic device 100 is placed flat on the desktop with the first display screen 12 facing down, the x-axis acceleration component of the gravity sensor defaults to 0, the y-axis acceleration component of the gravity sensor defaults to 0, and the z-axis acceleration component of the gravity sensor defaults to −9.81 m/s$^2$; when the electronic device 100 is tilted to the left, the x-axis acceleration component of the gravity sensor is positive; when the electronic device 100 is tilted to the right, the x-axis acceleration component of the gravity sensor is negative; when the electronic device 100 is tilted upward, the y-axis acceleration component of the gravity sensor is negative; when the electronic device 100 is tilted downward, the y-axis acceleration component of the gravity sensor is positive.

In some embodiments, if the z-axis acceleration component of the gravity sensor 16 acquired by the processor 20 is greater than the first preset value, for example, the z-axis acceleration component of the gravity sensor 16 acquired by the processor 20 is 6 m/s$^2$, which is greater than the first preset value of 3 m/s$^2$, it is determined that the first display screen 12 faces the user of the electronic device 100. In this case, the processor 20 determines that the electronic device 100 is in the first usage state. If the z-axis acceleration component of the gravity sensor 16 acquired by the processor 20 is less than the second preset value, for example, the z-axis acceleration component of the gravity sensor 16 acquired by the processor 20 is −6 m/s$^2$, which is less than the second preset value of −3 m/s$^2$, it is determined that the second display screen 13 faces the user of the electronic device 100. In this case, the processor 20 determines that the electronic device 100 is in the second usage state.

The electronic device 100 and the controlling method according to embodiments of the present disclosure determine the usage state of the electronic device 100 through the gravity sensor 16, so that the laser projector 14 may be used to project a laser in a corresponding mode without the user manually selecting the usage state of the electronic device 100, thereby improving the usage experience of the electronic device 100.

Figure 7:
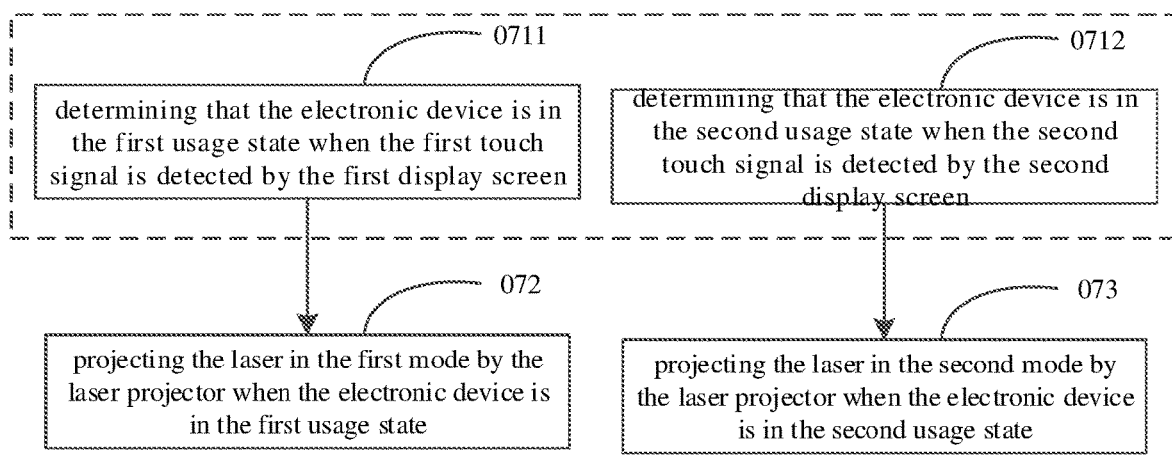
FIG. 7 is a schematic flow chart of a controlling method for an electronic device according to some embodiments of the present disclosure.

As illustrated in FIG. 7, in some embodiments, the first display screen 12 and the second display screen 13 are both touch display screens. The determination of the usage state of the electronic device 100 may be achieved according to detection of a first touch signal by the first display screen 12 and/or detection of a second touch signal by the second display screen 13. Specifically, the controlling method includes:

0711, determining that the electronic device 100 is in the first usage state when the first touch signal is detected by the first display screen 12;

0712, determining that the electronic device 100 is in the second usage state when the second touch signal is detected by the second display screen 13;

072, projecting the laser in the first mode by the laser projector 14 when the electronic device 100 is in the first usage state; and

073, projecting the laser in the second mode by the laser projector 14 when the electronic device 100 is in the second usage state, the energy of the laser projected in the second mode being greater than that of the laser projected in the first mode.

The above-mentioned controlling method may also be implemented by the electronic device 100, in which the steps 0711 and 0712 may be sub-steps of the step 031 as described hereinbefore, the step 072 is basically the same as the step 032 described hereinbefore, and the step 073 is basically the same as the step 033 described hereinbefore. Specifically, the processor 20 may be further configured to determine the usage state of the electronic device 100 according to the detection of the first touch signal by the first display screen 12 and/or the detection of the second touch signal by the second display screen 13, and the processor 20 may be further configured to implement the steps 0711 and 0712. That is, the processor 20 may be further configured to determine that the electronic device 100 is in the first usage state when the first touch signal is detected by the first display screen 12, and determine that the electronic device 100 is in the second usage state when the second touch signal is detected by the second display screen 13.

Both the first touch signal and the second touch signal may be capacitive signals. The processor 20 is electrically connected to the first display screen 12 and the second display screen 13, and the processor 20 may acquire the first touch signal detected by the first display screen 12 and the second touch signal detected by the second display screen 13. When the user of the electronic device 100 touches the first display screen 12, the capacitive signal of the first display screen 12 changes and is detected by the first display screen 12 (that is, the first touch signal is detected by the first display screen 12), at this time, the first display screen 12 faces the user of the electronic device 100 and is used by the user, and the processor 20 determines that the electronic device 100 is in the first usage state. When the user of the electronic device 100 touches the second display screen 13, the capacitive signal of the second display screen 13 changes and is detected by the second display screen 13 (that is, the second touch signal is detected by the second display screen 13), at this time, the second display screen 13 faces the user of the electronic device 100 and is used by the user, and the processor 20 determines that the electronic device 100 is in the second usage state.

The electronic device 100 and the controlling method according to embodiments of the present disclosure determine the usage state of the electronic device 100 through the first display screen 12 or the second display screen 13, without providing additional hardware on the electronic device 100, which saves the production cost of the electronic device 100.

As illustrated in FIG. 8, in some embodiments, the electronic device 100 further includes a state selection key 17 electrically connected to the processor 20, and the determination of the usage state of the electronic device 100 (step 031) may be achieved through the state selection key 17. Specifically, the processor 20 may be further configured to determine the usage state of the electronic device 100 through the state selection key 17. The state selection key 17 may be a physical key and includes a first state key 171 and a second state key 172. When the processor 20 detects that the first state key 171 is triggered, the processor 20 determines that the electronic device 100 is in the first usage state; when the processor 20 detects that the second state key 172 is triggered, the processor 20 determines that the electronic device 100 is in the second usage state. In other embodiments, the state selection key 17 may be a virtual key and may be displayed by the first display screen 12 and the second display screen 13. For example, the state selection key 17 may be a state switching key displayed on the first display screen 12 or the second display screen, and the state switching key is used to switch between the first usage state and the second usage state.

The electronic device 100 and the controlling method according to embodiments of the present disclosure determine the usage state of the electronic device 100 through the state selection key 17, so that the user can accurately select the required usage state according to needs.

As illustrated in FIG. 1, in some embodiments, the electronic device 100 further includes a visible light camera 40, the visible light camera 40 includes a primary camera 41 and a secondary camera 42, and both the primary camera 41 and the secondary camera 42 are installed at the first surface 111 of the shell 11. The primary camera 41 may be a wide-angle camera with low sensitivity to motion, a relatively slow shutter speed can also ensure the sharpness of image shooting, and the wide-angle camera has a large field of view, can cover a wide range of scenes, and can emphasize the foreground and highlight near and far comparison. The secondary camera 42 may be a telephoto camera, and a telephoto lens of the telephoto camera can identify objects at a further distance. Alternatively, the primary camera 41 is a color camera, and the secondary camera 42 is a black and white camera. The electronic device 100 described herein may include a plurality of the cameras, such as three, four or more cameras. In some embodiments, the laser projector 14, the secondary camera 42, the primary camera 41 and the image collector 15 are sequentially arranged at intervals and located on the same straight line.

As illustrated in FIG. 1 and FIG. 2, the first display screen 12 is installed on the first surface 111 of the shell 11, and the first display screen 12 may cover 85% or more of the area of the first surface 111, such as 85%, 86%, 87%, 88%, 89%, 90%, 91%, 92%, 93%, 95% or even 100%. The second display screen 13 is installed on the second surface 112 of the shell 11, and the second display screen 13 may cover 85% or more of the area of the second surface 112, such as 85%, 86%, 87%, 88%, 89%, 90%, 91%, 92%, 93%, 95% or even 100%. Both the first display screen 12 and the second display screen 13 may be used to display a screenage, and the screenage may include information like text, images, videos, icons and the like.

The first display screen 12 includes a display region 122, and the display region 122 may be used to display a screenage. To adapt different types of electronic devices 100 and meet different needs of users, the display region 122 may be in a circular, oval, racetrack, rounded rectangular or rectangular shape.

As illustrated in FIG. 9, the display region 122 has a front surface 123 and a back surface 124 opposite to each other, the display region 122 may be used to display the screenage, and light emitted by the first display screen 12 are transmitted outwards in a direction from the back surface 124 to the front surface 123. When the electronic device 100 is in the first usage state (that is, the user is located on the same side with the first surface 111), the light pass through the front surface 123 and are received by the user, that is, the user observes the screenage displayed on the first display screen 12 from the front surface 123. It will be understood that the front surface 123 is a display surface, and the back surface 124 is a surface opposite to the display surface. Both the front surface 123 and the back surface 124 may be flat or curved.

In some examples, the first display screen 12 may further include a non-display region, and the non-display region may be formed at a periphery of the display region 122. The non-display region may not be used for display, and the non-display region may be bonded with the shell 11 or may be used for wiring. For example, the non-display region may be bonded with the shell 11 via an adhesive, without affecting the display function of the display region 122. The first display screen 12 may also be a touch display screen integrated with a touch function, and the user, after acquiring screenage information displayed on the first display screen 12, may perform touch controls on the first display screen 12 to achieve predetermined interactive operations.

As illustrated in FIG. 8, in some embodiments, the display region 122 includes a plurality of pixels arranged in a preset manner, and there is a microscopic gap between adjacent pixels. The display region 122 includes a first display sub-region 1221 and a second display sub-region 1222. The first display sub-region 1221 has a smaller pixel density than that of the second display sub-region 1222.

The pixel density of the first display sub-region 1221 is smaller than that of the second display sub-region 1222, that is, the microscopic gap of the first display sub-region 1221 is larger than that of the second display sub-region 1222, the first display sub-region 1221 has a smaller blocking effect on light, and light passing through the first display sub-region 1221 has a relatively high transmittance. In other embodiments, the pixel density of the first display sub-region 1221 may be greater than the that of the second display sub-region 1222, or the pixel density of the first display sub-region 1221 may be equal to that of the second display sub-region 1222.

In some embodiments, the shapes of the first display sub-region 1221 and the second display sub-region 1222 may be set according to specific requirements, which will not be limited herein. For example, the first display sub-region 1221 may be set in a racetrack shape or a water drop shape, etc., and the second display sub-region 1222 and the first display sub-region 1221 may be complementary and together form the display region 122 in the rectangular or rounded rectangular shape. The first display sub-region 1221 may be located in a position near an edge of the display region 122, and the second display sub-region 1222 may be located in a middle position of the display region 122. The first display sub-region 1221 may be used to display state icons of the electronic device 100, for example, the first display sub-region 1221 may be used to display a battery power, a network connection state, system time and the like of the electronic device 100.

As illustrated in FIG. 9, the first display screen 12 and the second display screen 13 are both full screens. The laser projector 14 is arranged on a side where the back surface 124 of the first display screen 12 is located, or in other words, the laser projector 14 is disposed below the display region 122 (for example, the laser projector 14 may be disposed below the first display sub-region 1221), and the laser projector 14 is used to emit a laser passing through the display region 122. Specifically, the laser projector 14 may include a laser source 140, a collimating element 145 and a diffractive optical element 146, and light (for example, an infrared laser) emitted by the laser source 140 is transmitted out of the laser projector 14 after collimated by the collimating element 145 and diffracted by the diffractive optical element 146, and then passes through the display region 122 to be projected to the outside. When the light passes through the microscopic gap, diffraction occurs. That is, the microscopic gap of the display region 122 and the diffractive structure of the diffractive optical element 146 both have a diffractive effect on the light emitted by the laser source 140.

The laser passing through the display region 122 and entering the outside may include a pattern diffracted by the diffractive optical element 146 (the pattern includes a plurality of speckles diffracted by the diffractive optical element 146) and a pattern diffracted by the microscopic gap of the first display screen 12 (the pattern includes a plurality of speckles sequentially diffracted by the diffractive optical element 146 and the first display screen 12), so that the speckle patterns after passing through the display region 122 have higher irrelevance, which is beneficial for subsequent processing of the obtained speckle pattern. In an example, the transmittance of the display region 122 may reach 60% or higher, so that the laser emitted by the laser projector 14 has a low loss when it passes through the display region 122.

The image collector 15 may be an infrared camera, a laser reaching an object to be measured and modulated by the object to be measured may be acquired by the image collector 15, and after receiving the modulated laser, the image collector 15 obtains speckle images, which are processed to obtain depth data of the object to be measured. The image collector 15 may also be disposed at the side where the back surface 124 of the first display screen 12 is located, that is, the image collector 15 may be disposed below the first display screen 12 (for example, may be disposed below the first display sub-region 1221). In this case, a light incident surface of the image collector 15 may be aligned with the display region 122, and the laser modulated by the object to be measured passes through the display region 122 and then is received by the image collector 15. Specifically, the laser modulated by the object to be measured may be diffracted by the microscopic gap of the first display screen 12 and then is received by the image collector 15.

Figure 10:
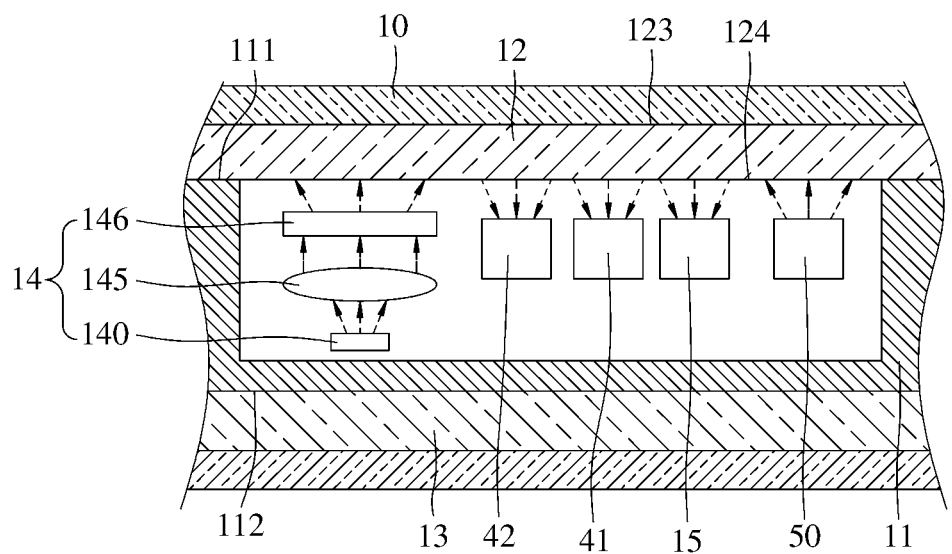
FIG. 10 is a sectional view of an electronic device according to some embodiments of the present disclosure along a same line as the IX-IX line shown in FIG. 8.

As illustrated in FIG. 10, in some embodiments, the electronic device 100 further includes a floodlight 50, which may be configured to emit supplementary light outwards to supplement intensity of ambient light when the when the ambient light is weak. In an example, the supplementary light may be infrared light. The supplementary light after reaching the object to be measured and reflected by the object to be measured may be acquired by the image collector 15 to obtain a two-dimensional image of the object to be measured, and information of the two-dimensional image may be used for identity recognition. The floodlight 50 may also be disposed at the side where the back surface 124 of the first display screen 12 is located, that is, the floodlight 50 may also be disposed below the first display screen 12 (for example, be disposed below the first display sub-region 1221). Specifically, the floodlight 50 may be installed on the same bracket together with the laser projector 14 and the image collector 15. In this case, the supplementary light emitted by the floodlight 50 passes through the microscopic gap of the display region 122 and enters the external environment, and the reflected supplementary light may pass through the microscopic gap again to be received by the image collector 15.

In summary, since the laser projector 14 and the image collector 15 are disposed at the side where the back surface 124 of the first display screen 12 is located, there is no need to provide an opening in the first display screen 12 to align with the laser projector 14 and the image collector 15, and the electronic device 100 has a relatively high screen-to-body ratio. In addition, in embodiments of the present disclosure, the laser projector 14 and the image collector 15 are disposed below the first display screen 12, a depth image acquired by the laser projector 14 and the image collector 15 has a higher resolution, as compared with that of depth information acquirable by time of flight (TOF), and using a depth image with a higher resolution in face recognition can improve the accuracy of the face recognition, and using a depth image with a higher resolution in 3D scene modeling can improve a matching degree between a modeled 3D scene and an actual scene.

If the laser projector 14 is disposed below the first display screen 12, the laser projected by the laser projector 14 will be affected by the microscopic gap in the first display screen 12 when it passes through the first display sub-region 1221, that is, the speckles in the speckle patterns projected into the scene include both the speckles formed by the laser only diffracted by the diffractive optical element 146 of the laser projector 14 and the speckles formed by the laser diffracted sequentially by the diffractive optical element 146 and the first display screen 12. The image collector 15 is disposed below the first display screen 12, and the image collector 15 receives the laser that is reflected by the object to be measured and diffracted by the first display screen 12 when passing through the first display screen 12, so a speckle image collected by the image collector 15 includes speckles formed by the laser diffracted only by the diffractive optical element 146 and reflected by the object to be measured, speckles formed by the laser diffracted sequentially by the diffractive optical element 146 and the first display screen 12 and reflected by the object to be measured, and speckles formed by the laser diffracted sequentially by the diffractive optical element 146 and the first display screen 12, reflected by the object to be measured, and then diffracted by the first display screen 12 again. Calculation of the depth image includes two ways as follows.

(1) The depth is calculated directly according to all speckles in the speckle image. In this case, a reference image includes reference speckles formed by a laser diffracted only by the diffractive optical element 146 and reflected by a calibration object, reference speckles formed by a laser diffracted sequentially by the diffractive optical element 146 and the first display screen 12 and reflected by the calibration object, and reference speckles formed by a laser diffracted sequentially by the diffractive optical element 146 and the first display screen 12, reflected by the calibration object, and then diffracted by the first display screen 12 again.

(2) Only the speckles formed by the laser diffracted only by the diffractive optical element 146 and reflected by the object to be measured are retained, based on which the depth calculation is performed, while the remaining speckles are filtered out. In this case, the reference image only includes the reference speckles formed by the laser diffracted only by the diffractive optical element 146 and reflected by the calibration object. It should be noted that speckles formed after different times of diffraction have different brightness. Therefore, various kinds of speckles may be distinguished by the brightness, so that unnecessary speckles may be filtered out.

Figure 11:
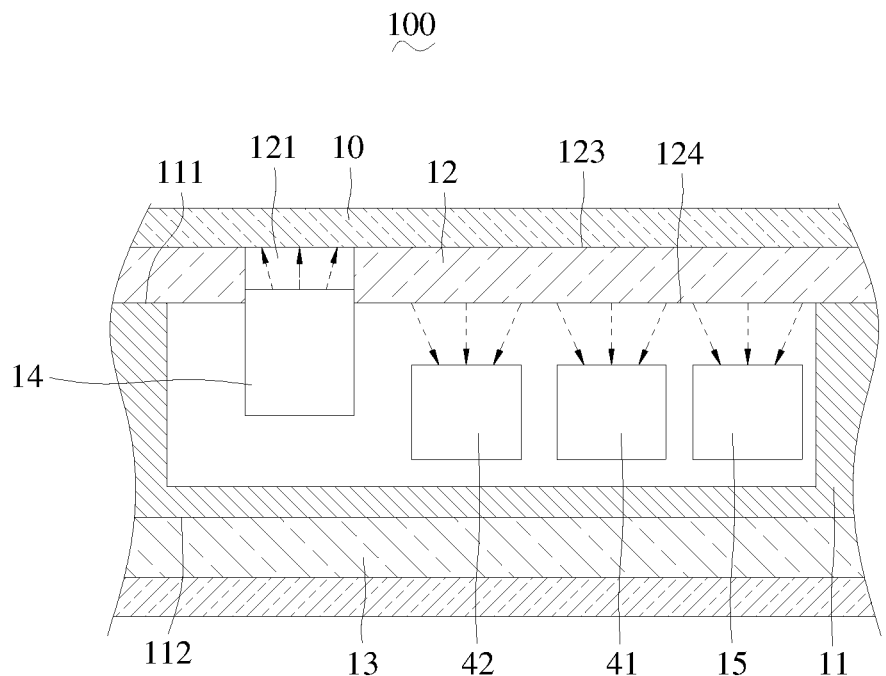
FIG. 11 is a sectional view of an electronic device according to some embodiments of the present disclosure along a same line as the IX-IX line shown in FIG. 8.

As illustrated in FIG. 11, in some embodiments, the first display screen 12 has an opening 121 at an end thereof, the laser projector 14 extends into the opening 121 for installation, and the image collector 15 is disposed below the first display screen 12. In this case, the laser projector 14 is disposed below the first display screen 12, and the laser projected by the laser projector 14 is not affected by the microscopic gap of the first display screen 12 when it passes through the first display screen 12 (i.e., the first display screen 12 has the opening 121 as illustrated in FIG. 11), and a speckle image collected by the image collector 15 located below the first display screen 12 includes speckles formed by a laser diffracted only by the diffractive optical element 146 and reflected by the object to be measured and speckles formed by a laser diffracted by the diffractive optical element 146, reflected by the object to be measured and then diffracted by the first display screen 12 again. Calculation of the depth image includes two ways as follows.

(1) The depth is calculated directly according to all speckles in the speckle image. In this case, a reference image includes reference speckles formed by a laser diffracted only by the diffractive optical element 146 and reflected by a calibration object and reference speckles formed by a laser diffracted by the diffractive optical element 146, reflected by the calibration object and then diffracted by the first display screen 12 again.

(2) Only the speckles formed by the laser diffracted only by the diffractive optical element 146 and reflected by the object to be measured are retained, based on which the depth calculation is performed, while the remaining speckles are filtered out. In this case, the reference image only includes the reference speckles formed by the laser diffracted only by the diffractive optical element 146 and reflected by the calibration object. It should be noted that speckles formed after different times of diffraction have different brightness. Therefore, various kinds of speckles may be distinguished by the brightness, so that unnecessary speckles may be filtered out.

Figure 12:
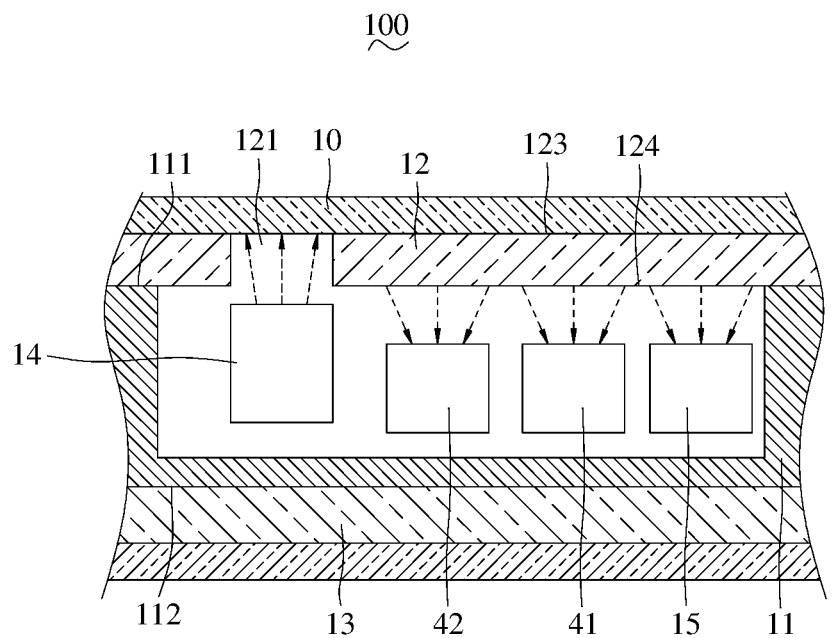
FIG. 12 is a sectional view of an electronic device according to some embodiments of the present disclosure along a same line as the IX-IX line shown in FIG. 8.

As illustrated in FIG. 12, in some embodiments, the first display screen 12 has an opening 121, and the opening 121 does not have a display function. The opening 121 penetrates through the front surface 123 and the back surface 124. The laser projector 14 is disposed at the side where the back surface 124 of the first display screen 12 is located and is aligned with the opening 121, and the laser projector 14 is configured to emit a laser passing through the opening 121. In an embodiment, the opening 121 may be defined in the first display sub-region 1221.

In this case, a light-emitting surface of the laser projector 14 may be aligned with the opening 121, and the laser emitted by the laser projector 14 passes through the opening 121 and enters the outside. In this embodiment, the laser entering the outside does not need to pass through the microscopic gap of the display region 122, and will not be diffracted by the microscopic gap, so that after the image collector 15 acquires the speckle image, the difficulty of subsequent calculation of the depth image based on the speckle image may be reduced.

Figure 13:
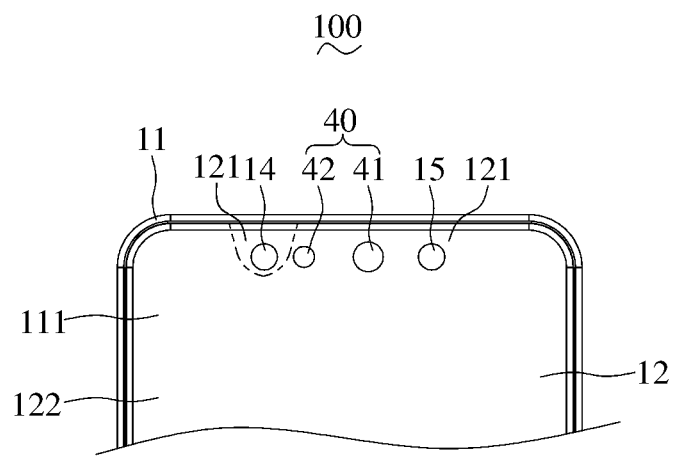
FIG. 13 is a schematic diagram of an electronic device according to some embodiments of the present disclosure.

Specifically, in the example as illustrated in FIG. 13, the opening 121 includes a notch formed on the edge of the first display screen 12, in other words, the opening 121 intersects with the edge of the first display screen 12. Specifically, the notch may be formed on any one or more edges of an upper edge, a lower edge, a left edge and a right edge of the first display screen 12. The notch may be in any shape, such as in a triangular, semicircular, rectangular or racetrack shape and the like, which will be not limited herein.

Figure 14:
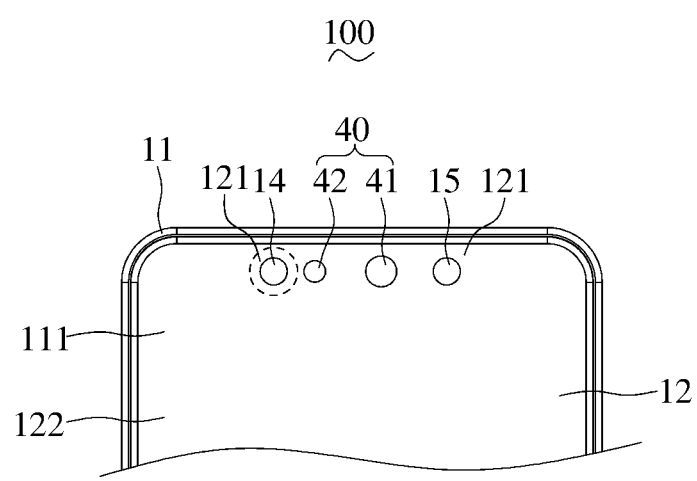
FIG. 14 is a schematic diagram of an electronic device according to some embodiments of the present disclosure.

In an example as illustrated in FIG. 14, the opening 121 includes a through-hole spaced apart from the edge of the first display screen 12, or in other words, the opening 121 is defined in a range enclosed by the edge of the first display screen 12. Specifically, the through-hole may be close to any one or more edges of the upper edge, the lower edge, the left edge and the right edge of the first display screen 12. The through-hole may be in any shape, such as in a triangular, circular, rectangular or racetrack shape and the like, which will be not limited herein.

Figure 15:
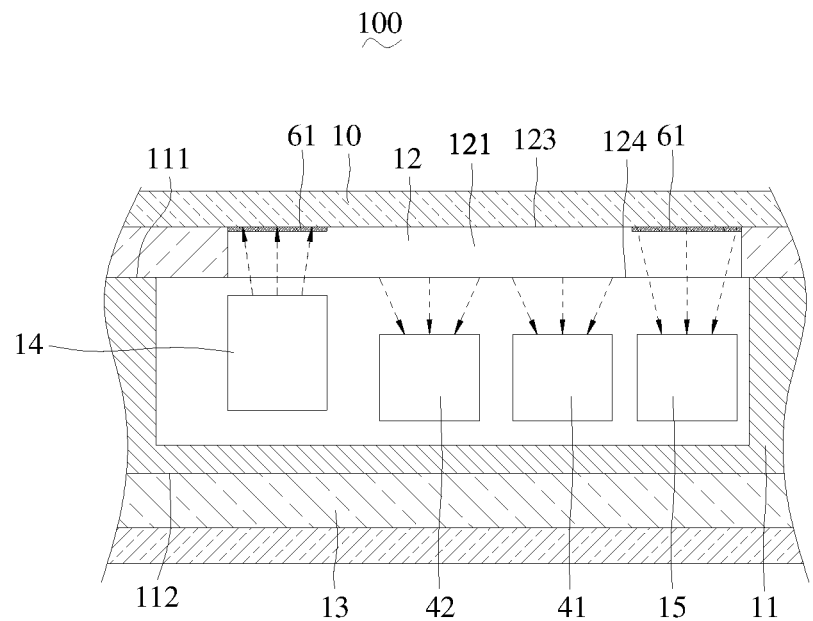
FIG. 15 is a sectional view of an electronic device according to some embodiments of the present disclosure along a same line as the IX-IX line shown in FIG. 8.

As illustrated in FIG. 15, in some embodiments, the electronic device 100 further includes a cover plate 10, and the cover plate 10 is disposed on a side where the front surface 123 of the first display screen 12 is located. When the first display screen 12 has an opening 121, and both the laser projector 14 and the image collector 15 are aligned with the opening 121, a region of the cover plate 10 corresponding to the laser projector 14 and the image collector 15 is provided with an infrared transmitting layer 61. In this case, the number of the opening 121 may be one or two.

The cover plate 10 may be made of material with good light transmission property such as glass or sapphire. The infrared transmitting layer 61 may be an infrared transmitting ink or an infrared transmitting film, and the infrared transmitting layer 61 has higher transmittance (such as 85% or higher) to infrared light (for example, light with a wavelength of 940 nanometers) and a lower transmittance to light other than the infrared light or does not allow the light other than the infrared light to transmit at all. Therefore, it is difficult for the user to see the laser projector 14 or the image collector 15 aligned with the opening 121 through the cover plate 10, and the electronic device 100 has a beautiful appearance.

Figure 16:
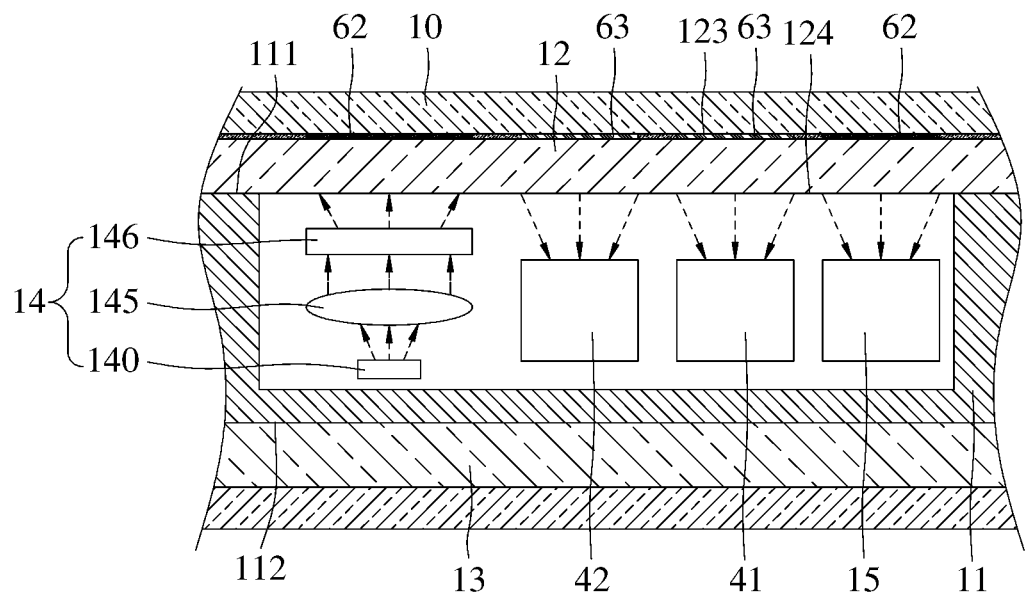
FIG. 16 is a sectional view of an electronic device according to some embodiments of the present disclosure along a same line as the IX-IX line shown in FIG. 8.

As illustrated in FIG. 16, in some embodiments, the electronic device 100 further includes a cover plate 10, the cover plate 10 is disposed on the side where the front surface 123 of the first display screen 12 is located, and a region of the cover plate 10 corresponding to the laser projector 14 is provided with an infrared antireflection film 62.

The infrared antireflection film 62 is capable of increasing the transmittance of the infrared light. When the laser projector 14 projects an infrared laser, the infrared antireflection film 62 is capable of increasing the transmittance of the infrared laser through the cover plate 10, so as to reduce the loss of the infrared laser when it passes through the cover plate 10, thereby reducing power consumption of the electronic device 100. Specifically, the infrared antireflection film 62 may be plated on an upper surface or a lower surface of the cover plate 10, or on both the upper surface and the lower surface of the cover plate 10.

Of course, a region of the cover plate 10 corresponding to the image collector 15 may also be provided with an infrared antireflection film 62 to reduce the loss of external infrared light when it passes through the cover plate 10 before reaching the image collector 15. A region of the cover plate 10 corresponding to the floodlight 50 may also be provided with an infrared antireflection film 62 to reduce the loss of the supplementary light emitted by the floodlight 50 when it passes through the cover plate 10. A visible light antireflection film 63 may be provided at a position of the cover plate 10 corresponding to the visible light camera 40 (including the primary camera 41 and the secondary camera 42) to reduce the loss of external visible light when it passes through the cover plate 10 before reaching the visible light camera 40.

Figure 17:
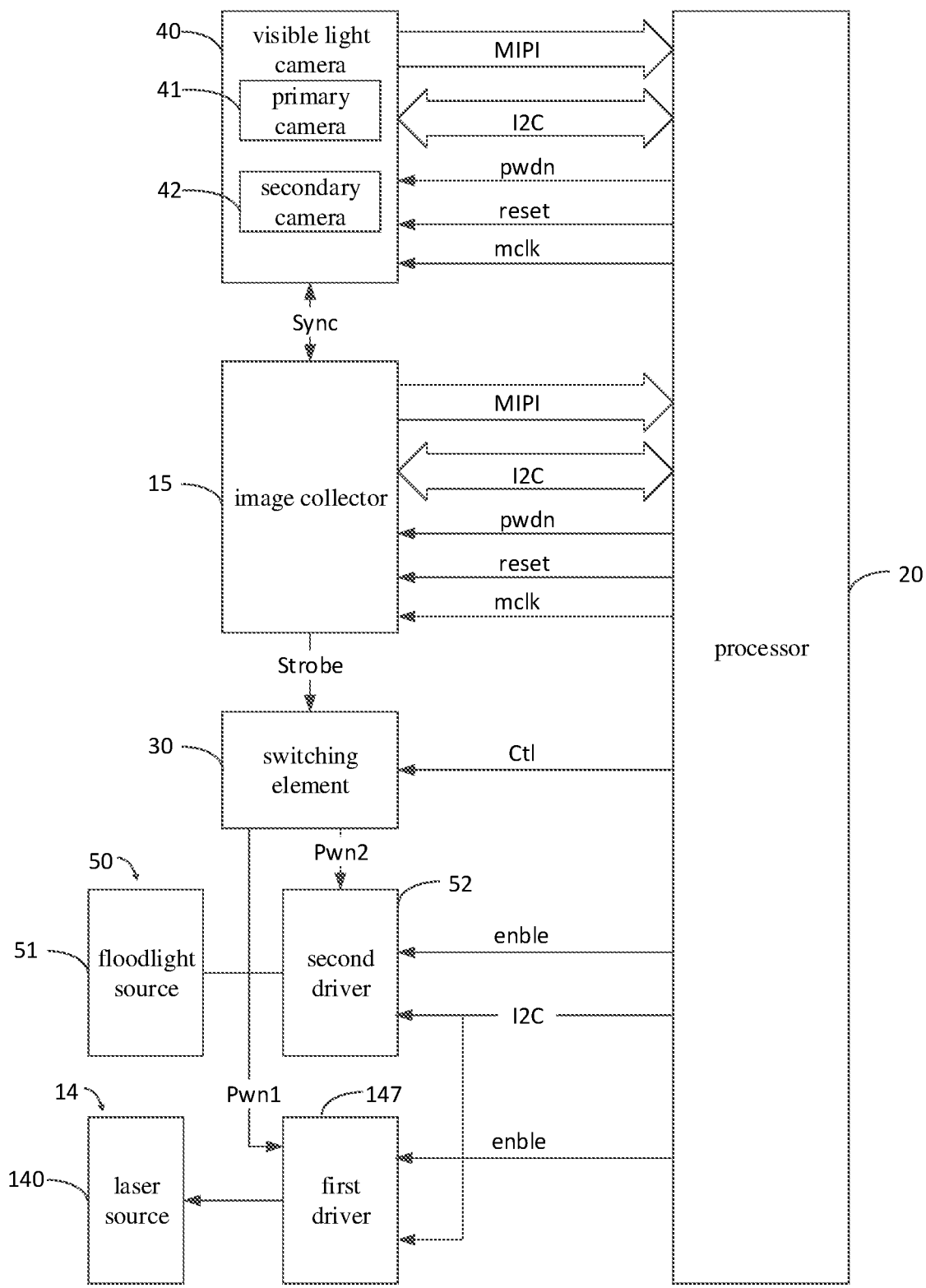
FIG. 17 is a schematic diagram illustrating a system architecture of an electronic device according to some embodiments of the present application.

As illustrated in FIG. 17, in some embodiments, the laser projector 14 includes a laser source 140 and a first driver 147, and the first driver 147 may be configured to drive the laser source 140 to project a laser to the object to be measured. Both the laser projector 14 and the image collector 15 are connected to the processor 20. The processor 20 may provide an enable signal for the laser projector 14, specifically, the processor 20 may provide an enable signal for the first driver 147. The image collector 15 is connected to the processor 20 via an I2C bus. The laser projector 14 is able to emit a laser, such as an infrared laser, which is reflected by an object in a scene after reaching the object, the reflected laser may be received by the image collector 15, and the processor 20 may calculate depth information of the object according to the laser emitted by the laser projector 14 and laser received by the image collector 15. In an example, the depth information may be obtained by the laser projector 14 and the image collector 15 via time of flight (TOF). In another example, the depth information may be obtained by the laser projector 14 and the image collector 15 based on a structured light ranging principle. The specification of the present disclosure is described by taking the case where the depth information is obtained by the laser projector 14 and the image collector 15 based on the structured light ranging principle as an example. In this case, the laser projector 14 is an infrared laser transmitter, and the image collector 15 is an infrared camera.

When the image collector 15 and the laser projector 14 are cooperated to use, in an example, the image collector 15 may control projection timing of the laser projector 14 through a first strobe signal, which is generated according to timing of the image collector 15 for acquiring collection images and may be regarded as electrical signals with alternate high and low levels, and the laser projector 14 projects the laser according to the laser projection timing instructed by the first strobe signal. Specifically, the processor 20 may send an image collection instruction through an I2C bus to activate the laser projector 14 and the image collector 15 and make the laser projector 14 and the image collector 15 work. After receiving the image collection instruction, the image collector 15 controls a switching element 30 through the first strobe signal, if the first strobe signal is at the high level, the switching element 30 sends a first pulse signal (pwn1) to the first driver 147, and the first driver 147 drives the laser source 140 to project a laser into a scene according to the first pulse signal; if the first strobe signal is at the low level, the switching element 30 stops sending the first pulse signal to the first driver 147, and the laser source 140 does not project the laser. Alternatively, it is also possible that when the first strobe signal is at the low level, the switching element 30 sends the first pulse signal to the first driver 147, and the first driver 147 drives the laser source 140 to project a laser into a scene according to the first pulse signal; when the first strobe signal is at the high level, the switching element 30 stops sending the first pulse signal to the first driver 147, and the laser source 140 does not project the laser. In another example, it is also possible that the first strobe signal is not needed when the image collector 15 and the laser projector 14 are cooperated to use. In this case, the processor 20 sends the image collection instruction to the image collector 15 and sends a laser projection instruction to the first driver 147 at the same time, the image collector 15 starts to acquire the collection image after receiving the image collection instruction, and the first driver 147 drives the laser source 140 to project a laser after receiving the laser projection instruction. When the laser projector 14 projects a laser, the laser forms a laser pattern with speckles, which is projected onto an object to be measured in a scene. The image collector 15 collects the laser pattern reflected by the object to be measured to obtain a speckle image, and sends the speckle image to the processor 20 through a mobile industry processor interface (MIPI). Each time the image collector 15 sends a frame of speckle image to the processor 20, the processor 20 receives a data stream. The processor 20 may calculate the depth image according to the speckle image and the reference image pre-stored in the processor 20.

In some embodiments, the visible light camera 40 is also connected to the processor 20 via an I2C bus, that is, both the primary camera 41 and the secondary camera 42 are connected to the processor 20 via the I2C bus. The visible light camera 40 may be configured to collect a visible light image; that is to say, the primary camera 41 and the secondary camera 42 are each configured to collect the visible light image, or the primary camera 41 and the secondary camera 42 are cooperated and used together to collect the visible light image; in other words, any one or both of the primary camera 41 and the secondary camera 42 may be used to collect the visible light image. Each time the visible light camera 40 (the primary camera 41 and/or the secondary camera 42) sends a frame of visible light image to the processor 20, the processor 20 receives a data stream. The visible light camera 40 may be used alone, that is, when the user just wants to obtain the visible light image, the processor 20 sends an image collection instruction to the visible light camera 40 (any one or both of the primary camera 41 and the secondary camera 42) via the I2C bus to activate the visible light camera 40 and make the visible light camera 40 work. The visible light camera 40 collects a visible light image of a scene after receiving the image collection instruction, and sends the visible light image to the processor 20 through a mobile industry processor interface. The visible light camera 40 (any one of the primary camera 41 and the secondary camera 42, or the primary camera 41 and the secondary camera 42 together) may also be cooperated with the laser projector 14 and the image collector 15, for example when the user wants to acquire a three-dimensional image based on a visible light image and a depth image, if the image collector 15 has a same operating frequency as that of the visible light camera 40, hardware synchronization between the image collector 15 and the visible light camera 40 may be realized through a sync signal. Specifically, the processor 20 sends the image collection instruction to the image collector 15 via the I2C bus. After receiving the image collection instruction, the image collector 15 can control the switching element 30 to send the first pulse signal (pwn1) to the first driver 147 through the first strobe signal, so that the first driver 147 drives the laser source 140 to emit a laser according to the first pulse signal; at the same time, the image collector 15 is synchronized with the visible light camera 40 through the sync signal, which controls the visible light camera 40 to collect the visible light image.

The electronic device 100 may further include a floodlight 50 disposed at the first surface 111. The floodlight 50 may be configured to emit uniform area light to a scene, the floodlight 50 includes a floodlight source 51 and a second driver 52, and the second driver 52 may be configured to drive the floodlight source 51 to emit the uniform area light. The light emitted by the floodlight 50 may be infrared light or other invisible light, such as ultraviolet light. As an example, the present disclosure will be illustrated with reference to the case where the light emitted by the floodlight 50 is the infrared light, but the form of the light emitted by the floodlight 50 is not limited thereto. The floodlight 50 is connected to the processor 20, and the processor 20 may provide an enable signal to drive the floodlight 50. Specifically, the processor 20 may provide the enable signal for the second driver 52. The floodlight 50 may be cooperated with the image collector 15 to collect an infrared image. When the image collector 15 is cooperated with the floodlight 50 to use, in an example, the image collector 15 may control emission timing of the floodlight 50 for emitting the infrared light through a second strobe signal (independent from the first strobe signal through which the image collector 15 controls the laser projector 14), the second strobe signal is generated according to timing of the image collector 15 for acquiring the collection image and may be regarded as electrical signals with alternate high and low levels, and the floodlight 50 emits the infrared light according to the infrared projection timing instructed by the second strobe signal. Specifically, the processor 20 may send an image collection instruction to the image collector 15 via the I2C bus, and the image collector 15 controls the switching element 30 through the second strobe signal after receiving the image collection instruction, if the second strobe signal is at the high level, the switching element 30 sends a second pulse signal (pwn2) to the second driver 52, and the second driver 52 controls the floodlight source 51 to emit the infrared light according to the second pulse signal; if the second strobe signal is at the low level, the switching element 30 stops sending the second pulse signal to the second driver 52, and the floodlight source 51 does not emit the infrared light. Alternatively, it is also possible that when the second strobe signal is at the low level, the switching element 30 sends the second pulse signal to the second driver 52, and the second driver 52 controls the floodlight source 51 to emit the infrared light according to the second pulse signal; when the second strobe signal is at the high level, the switching element 30 stops sending the second pulse signal to the second driver 52, and the floodlight source 51 does not emit the infrared light. When the floodlight 50 emits the infrared light, the image collector 15 receives infrared light reflected by an object in a scene to form an infrared image, and sends the infrared image to the processor 20 through the mobile industry processor interface. Each time the image collector 15 sends a frame of infrared image to the processor 20, the processor 20 receives a data stream. This infrared image is usually used for iris recognition, face recognition, etc.

Figure 18:
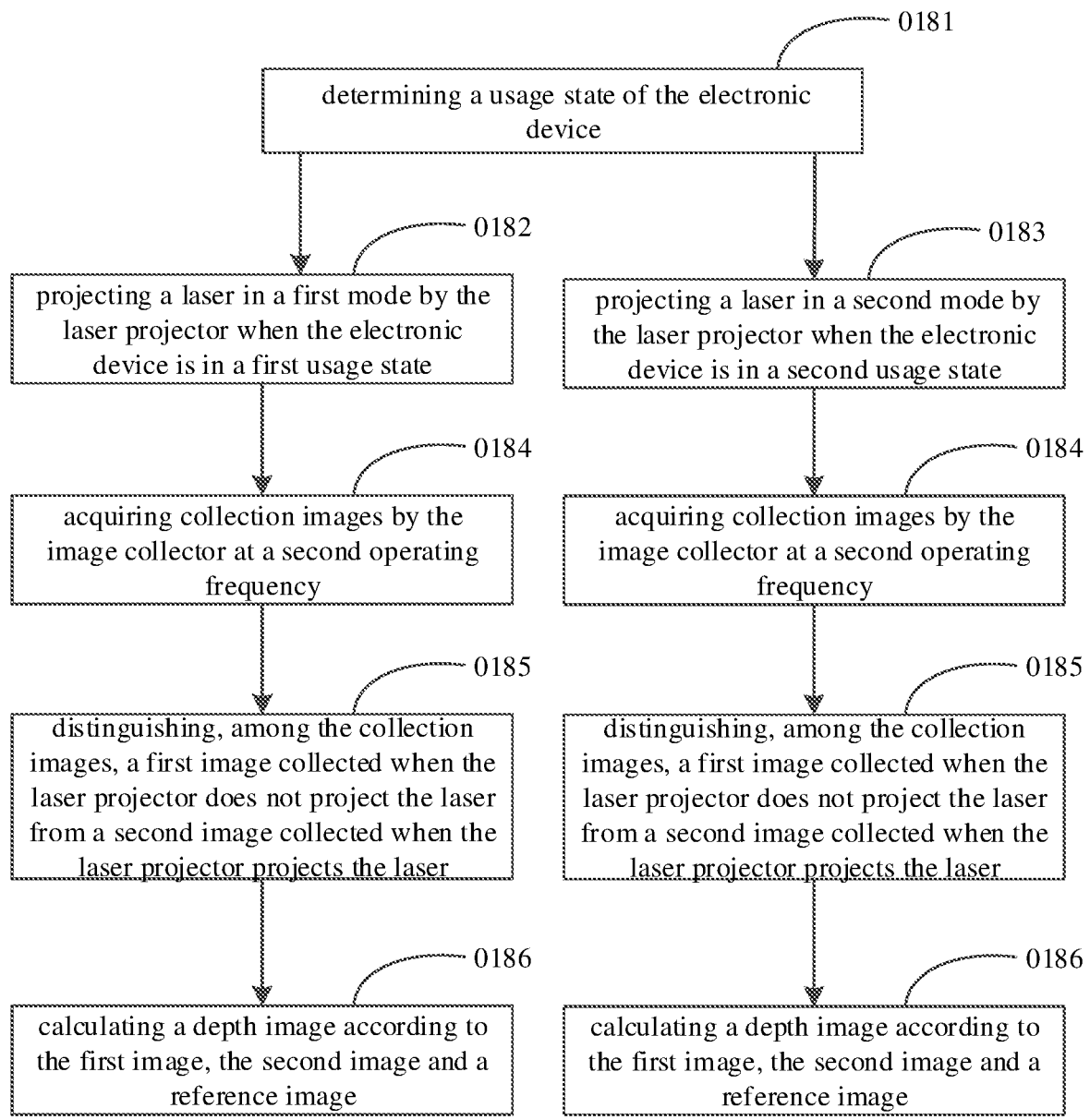
FIG. 18 is a schematic flow chart of a controlling method for an electronic device according to some embodiments of the present disclosure.

As illustrated in FIG. 1 and FIG. 18, in some embodiments, the electronic device 100 further includes an image collector 15 disposed at the first surface 111, when the laser projector 14 projects a laser (when the laser projector 14 projects a laser in the first mode, or when the laser projector 14 projects a laser in the second mode), the laser projector 14 projects the laser to a scene at a first operating frequency, and the controlling method further includes:

0184, acquiring collection images by the image collector 15 at a second operating frequency, the second operating frequency being greater than first operating frequency;

0185, distinguishing, among the collection images, a first image collected when the laser projector 14 does not project the laser from a second image collected when the laser projector 14 projects the laser; and

0186, calculating a depth image according to the first image, the second image and a reference image.

In other words, the controlling methods include:

0181, determining a usage state of the electronic device 100;

0182, projecting a laser in a first mode by the laser projector 14 when the electronic device 100 is in a first usage state;

0183, projecting a laser in a second mode by the laser projector 14 when the electronic device 100 is in a second usage state, the laser projected in the second mode having a greater energy than that of the laser projected in the first mode;

0184, acquiring collection images by the image collector 15 at a second operating frequency, the second operating frequency being greater than first operating frequency;

0185, distinguishing, among the collection images, a first image collected when the laser projector 14 does not project the laser from a second image collected when the laser projector 14 projects the laser; and

0186, calculating a depth image according to the first image, the second image and a reference image.

The above controlling method may also be implemented by the electronic device 100, in which the step 0181 is basically the same as the step 031 described hereinbefore, the step 0182 is basically the same as the step 032 described hereinbefore, and the step 0183 is basically the same as the step 033 described hereinbefore. The image collector 15 may be configured to implement the step 0184, and the processor 20 may be further configured to implement the steps 0185 and 0186. In other words, the image collector 15 is configured to acquire the collection images at the second operating frequency, and the processor 20 is further configured to distinguish, among the collection images, the first image collected when the laser projector 14 does not project the laser from the second image collected when the laser projector 14 projects the laser, and to calculate the depth image according to the first image, the second image and the reference image.

Figure 19:
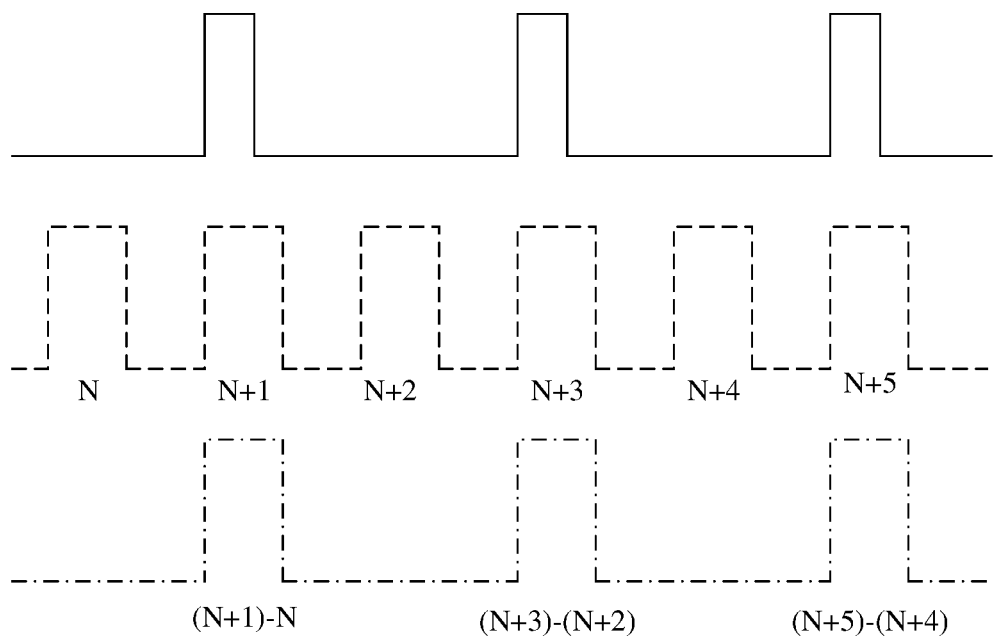
FIG. 19 is a schematic diagram illustrating a principle of a controlling method for an electronic device according to some embodiments of the present disclosure.

Specifically, when the operating frequency of the image collector 15 is different from that of the laser projector 14 (that is, the second operating frequency is greater than the first operating frequency), the depth image needs to be acquired in usage scenes such as unlocking, payment, decryption, and 3D modeling. In an example, the processor 20 simultaneously sends an image collection instruction for acquiring a depth image to the image collector 15 and the first driver 147 via the I2C bus. The first driver 147 drives the laser source 140 to emit infrared laser to a scene at the first operating frequency after receiving the image collection instruction; and the image collector 15 collects infrared laser reflected back by an object in the scene at the second operating frequency to acquire the collection image after receiving the image collection instruction. For example, as illustrated in FIG. 19, a solid line represents laser emission timing of the laser projector 14, a dashed line represents timing of the image collector 15 for acquiring the collection images and the number of frames of the collection images, and a dot dash line represents the number of frames of the third images obtained according to the first image and the second image, and the three kinds of lines, i.e., the solid line, the dashed line and the dot dash line are shown in this order from top to bottom in FIG. 19, and the second operating frequency is twice the first operating frequency. Referring to the solid line and the dashed line as illustrated in FIG. 19, the image collector 15 first receives infrared light in the environment (hereinafter referred to as ambient infrared light) to obtain the $N^{th}$ frame of collection image (in this case, it is the first image, also known as a background image) when the laser projector 14 does not project a laser, and sends the $N^{th}$ frame of collection image to the processor 20 through the mobile industry processor interface; then, the image collector 15 receives the ambient infrared light and an infrared laser emitted by the laser projector 14 to acquire the $(N+1)^{th}$ frame of collection image (in this case, it is the second image, also known as an interference speckle image) when the laser projector 14 projects a laser, and sends the $(N+1)^{th}$ frame of collection image to the processor 20 through the mobile industry processor interface; subsequently, the image collector 15 receives the ambient infrared light again to obtain the $(N+2)^{th}$ frame of collection image (in this case, it is the first image) when the laser projector 14 does not project a laser, and sends the $(N+2)^{th}$ frame of collection image to the processor 20 through the mobile industry processor interface, and so on, that is, the image collector 15 alternately obtains the first image and the second image.

In another example, the processor 20 sends a collection instruction for acquiring a depth image to the image collector 15 via an I2C bus. The image collector 15 controls the switching element through the first strobe signal to send the first pulse signal to the first driver 147 after receiving the image collection instruction, the first driver 147 drives the laser source 140 to project a laser at the first operating frequency according to the first pulse signal (that is, the laser projector 14 projects the laser at the first operating frequency), and the image collector 15 collects infrared laser reflected by an object in a scene at the second operating frequency to obtain the collection image. As illustrated in FIG. 19, the solid line represents the laser emission timing of the laser projector 14, the dashed line represents the timing of the image collector 15 for acquiring the collection images and the number of frames of the collection images, and the dot dash line represents the number of frames of the third images obtained according to the first image and the second image, and the three kinds of lines, i.e., the solid line, the dashed line and the dot dash line are shown in this order from top to bottom in FIG. 19, and the second operating frequency is twice the first operating frequency. Referring to the solid line and the dashed line as illustrated in FIG. 19, the image collector 15 first receives the ambient infrared light to obtain the $N^{th}$ frame of collection image (in this case, it is the first image, also known as a background image) when the laser projector 14 does not project a laser, and sends the $N^{th}$ frame of collection image to the processor 20 through the mobile industry processor interface; then, the image collector 15 receives the ambient infrared light and an infrared laser emitted by the laser projector 14 to acquire the $(N+1)^{th}$ frame of collection image (in this case, it is the second image, also known as an interference speckle image) when the laser projector 14 projects the laser, and sends the $(N+1)^{th}$ frame of collection image to the processor 20 through the mobile industry processor interface; subsequently, the image collector 15 receives the ambient infrared light again to obtain the $(N+2)^{th}$ frame of collection image (in this case, it is the first image) when the laser projector 14 does not project a laser, and sends the $(N+2)^{th}$ frame of collection image to the processor 20 through the mobile industry processor interface, and so on, that is, the image collector 15 alternately obtains the first image and the second image.

It should be noted that the image collector 15 may simultaneously perform the acquisition of the collection image while sending the collection image to the processor 20. Moreover, it is also possible that the image collector 15 acquires the second image first, and then acquires the first image, and alternately perform the acquisition of the collection image in this order. In addition, the above-described multiple relationship between the second operating frequency and the first operating frequency is only used as an example, and in other embodiments, the multiple relationship between the second operating frequency and the first operating frequency may also be three times, four times, five times, six times and so on.

Each time the processor 20 receives a frame of collection image, the processor 20 will distinguish the received collection image and determine whether the collection image is the first image or the second image. After receiving at least one frame of first image and at least one frame of second image, the processor 20 will calculate the depth image according to the first image, the second image, and the reference image. Specifically, since the first image is collected when the laser projector 14 does not project a laser, light that forms the first image includes only the ambient infrared light, and since the second image is collected when the laser projector 14 projects a laser, light that forms the second image includes both the ambient infrared light and the infrared laser emitted by the laser projector 14. Therefore, the processor 20 can remove the collection image formed by the ambient infrared light from the second image according to the first image, so as to obtain the collection image only formed by the infrared laser (i.e., the speckle image formed by the infrared laser).

It will be understood that the ambient light includes infrared light with the same wavelength as the infrared laser emitted by the laser projector 14 (for example, including ambient infrared light with a wavelength of 940 nm), and this part of infrared light will also be received by the image collector 15 when the image collector 15 acquires the collection image. When the brightness of the scene is high, the proportion of the ambient infrared light in the light received by the image collector 15 will increase, resulting in inconspicuous laser speckles in the collection image, thereby affecting the calculation of the depth image.

The controlling method according to the present disclosure controls the laser projector 14 and the image collector 15 to work at different operating frequencies, so that the image collector 15 is able to collect both the first image only formed by the ambient infrared light and the second image formed by both the ambient infrared light and the infrared light emitted by the laser projector 14, remove a part of the second image formed by the ambient infrared light according to the first image, so as to distinguish the laser speckles, and calculate the depth image using the collection image formed only by the infrared laser emitted by the laser projector 14, without affecting the laser speckle matching, which avoids partial or complete loss of the depth information, thereby improving the accuracy of the depth image.

Figure 20:
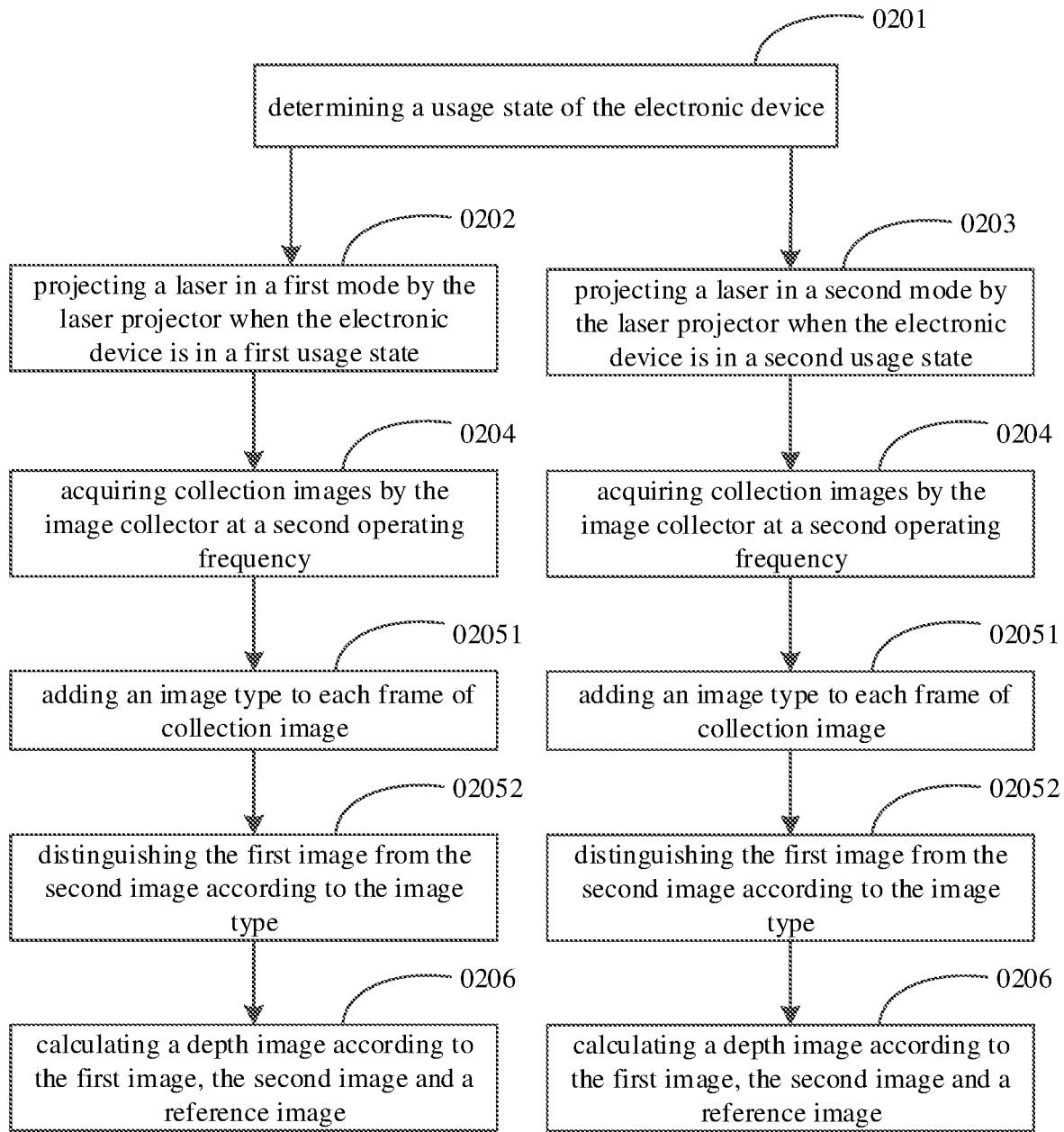
FIG. 20 is a schematic flow chart of a controlling method for an electronic device according to some embodiments of the present disclosure.

As illustrated in FIG. 1 and FIG. 20, in some embodiments, the controlling method includes:

0201, determining a usage state of the electronic device 100;

0202, projecting a laser in a first mode by the laser projector 14 when the electronic device 100 is in a first usage state;

0203, projecting a laser in a second mode by the laser projector 14 when the electronic device 100 is in a second usage state, the laser projected in the second mode having a greater energy than that of the laser projected in the first mode;

0204, acquiring collection images by the image collector 15 at a second operating frequency, the second operating frequency being greater than first operating frequency;

02051, adding an image type to each frame of collection image; and

02052, distinguishing the first image from the second image according to the image type; and

0206, calculating a depth image according to the first image, the second image and a reference image.

Figure 21:
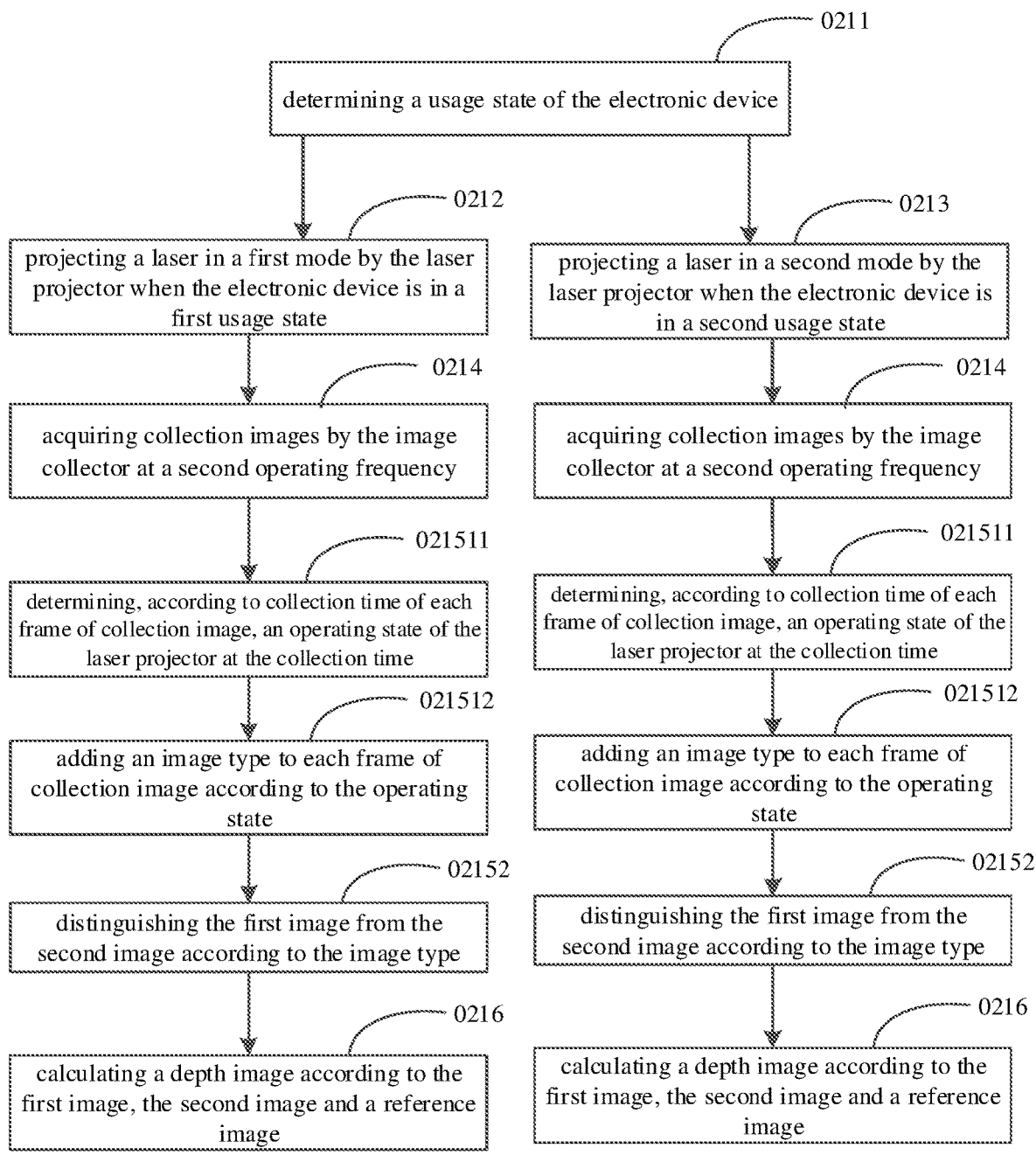
FIG. 21 is a schematic flow chart of a controlling method for an electronic device according to some embodiments of the present disclosure.

As illustrated in FIG. 1 and FIG. 21, in some embodiments, the controlling method includes:

0211, determining a usage state of the electronic device 100;

0212, projecting a laser in a first mode by the laser projector 14 when the electronic device 100 is in a first usage state;

0213, projecting a laser in a second mode by the laser projector 14 when the electronic device 100 is in a second usage state, the laser projected in the second mode having a greater energy than that of the laser projected in the first mode;

0214, acquiring collection images by the image collector 15 at a second operating frequency, the second operating frequency being greater than first operating frequency;

021511, determining, according to collection time of each frame of collection image, an operating state of the laser projector 14 at the collection time;

021512, adding an image type to each frame of collection image according to the operating state;

02152, distinguishing the first image from the second image according to the image type; and

0216, calculating a depth image according to the first image, the second image and a reference image.

The above controlling method may also be implemented by the electronic device 100, in which the step 0201 is basically the same as the step 031 described hereinbefore, the step 0202 is basically the same as the step 032 described hereinbefore, the step 0203 is basically the same as the step 033 described hereinbefore, the step 0204 is basically the same as the step 0184 described hereinbefore, the steps 02051 and 02052 may be sub-steps of the step 0185 described hereinbefore, the step 0206 is basically the same as the step 0186 described hereinbefore; the step 0211 is the same as the step 031 described hereinbefore, the step 0212 is basically the same as the step 032 described hereinbefore, the step 0213 is basically the same as the step 033 described hereinbefore, the step 0214 is basically the same as the step 0184 described hereinbefore, the steps 021511 and 021512 may be sub-steps of the step 02051 described hereinbefore, the step 02152 is basically the same as the step 02052 described hereinbefore, and the step 0216 is basically the same as the step 0186 described hereinbefore. The steps 02051, 02052, 021511, 021512 and 02152 all may be implemented by the processor 20. In other words, the processor 20 may also be configured to add an image type for each frame of collection image, and distinguish the first image from the second image according to the image type. When the processor 20 is configured to add the image type for each frame of collection image, the processor 20 is specifically configured to determine, according to collection time of each frame of collection image, an operating state of the laser projector 14 at the collection time, and add an image type for each frame of collection image according to the operating state.

Specifically, each time the processor 20 receives a frame of collection image from the image collector 15, the processor 20 will add an image type to the collection image, so that the first image and the second image may be distinguished according to the image type in subsequent processing. Specifically, during the acquisition of the collection image by the image collector 15, the processor 20 will monitor the operating state of the laser projector 14 in real time via the I2C bus. Each time the processor 20 receives a frame of collection image from the image collector 15, the processor 20 will acquire the collection time of the collection image first, and then determine according to the collection time of the collection image whether the laser projector 14 projects a laser or not during the collection time of the collection image, and add the image type to the collection image based on the judgment result. The collection time of the collection image may be start time or end time each time the image collector 15 acquires the collection image, or any time between the start time and the end time. In this way, it is possible to realize the correspondence between each frame of collection image and the operating state (projecting a laser or not) of the laser projector 14 during the acquisition of this frame of collection image, and accurately distinguish the type of the collection image. In an example, structures of the image type (stream_type) are shown in Table 1:

TABLE 1

| stream | stream_type | light |
|---|---|---|
| 0 | 0 | 0 |
| 0 | 0 | 1 |

As illustrated in Table 1, when the stream is 0, it means that the data stream at this time is an image formed by the infrared light and/or the infrared laser. When the light is 00, it means that the data stream at this time is acquired without any equipment projecting the infrared light and/or the infrared laser (there is only the ambient infrared light), then the processor 20 may add a stream_type 000 to the collection image to identify this collection image as the first image. When the light is 01, it means that the data stream at this time is acquired when the laser projector 14 projects the infrared laser (there are both the ambient infrared light and the infrared laser), then the processor 20 may add a stream type 001 to the collection image to identify this collection image as the second image. The processor 20 may distinguish the image types of the collection images according to the stream_type in the subsequent processing.

Figure 22:
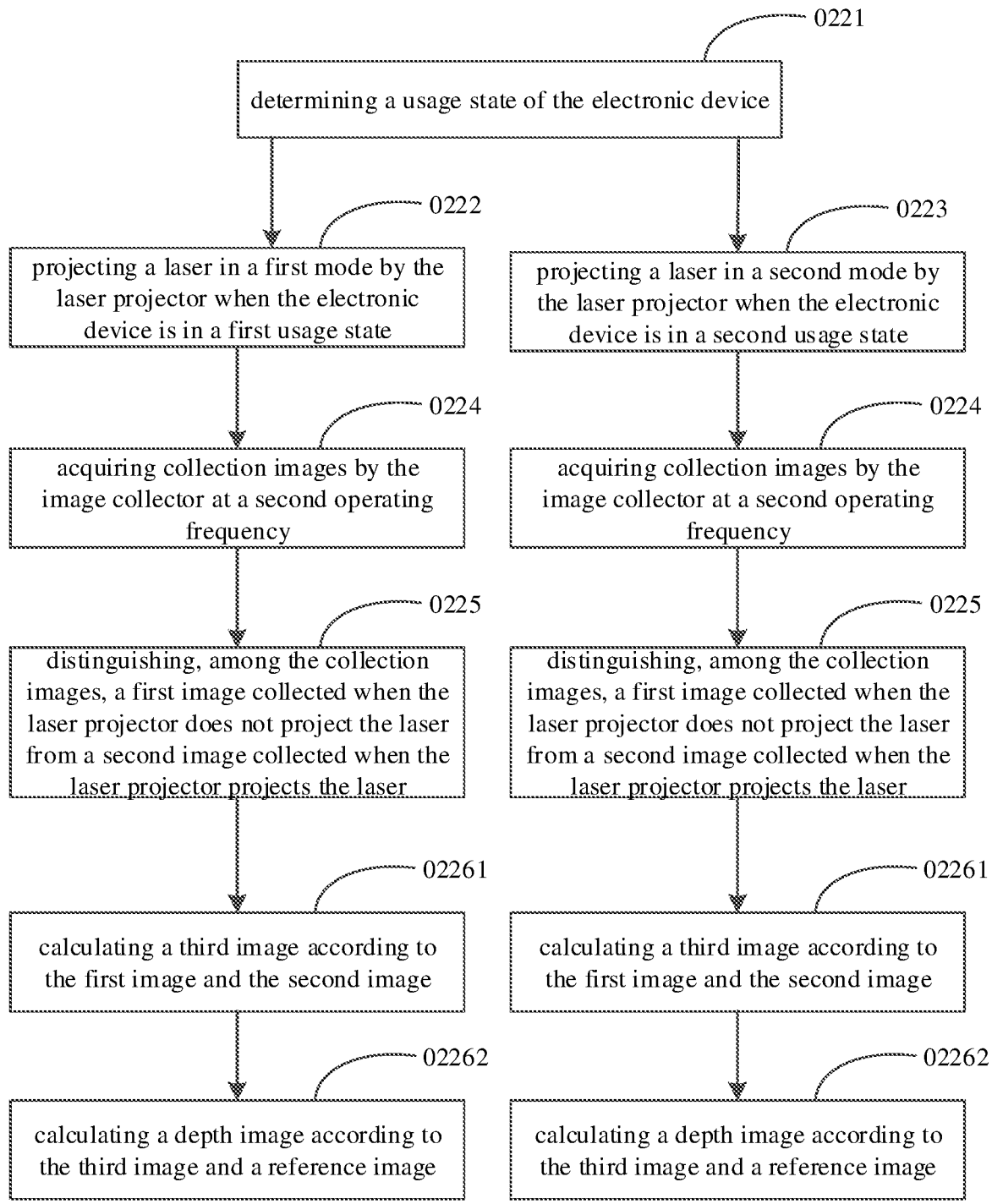
FIG. 22 is a schematic flow chart of a controlling method for an electronic device according to some embodiments of the present disclosure.

As illustrated in FIG. 1 and FIG. 22, in some embodiments, the controlling method includes:
   0221, determining a usage state of the electronic device 100;
   0222, projecting a laser in a first mode by the laser projector 14 when the electronic device 100 is in a first usage state;
   0223, projecting a laser in a second mode by the laser projector 14 when the electronic device 100 is in a second usage state, the laser projected in the second mode having a greater energy than that of the laser projected in the first mode;
   0224, acquiring collection images by the image collector 15 at a second operating frequency, the second operating frequency being greater than first operating frequency;
   0225, distinguishing, among the collection images, a first image collected when the laser projector 14 does not project the laser from a second image collected when the laser projector 14 projects the laser;
   02261, calculating a third image according to the first image and the second image, a difference between collection time of the first image and collection time of the second image being less than a preset value; and
   02262, calculating a depth image according to the third image and a reference image.

The above controlling method may also be implemented by the electronic device 100, in which the step 0221 is basically the same as the step 031 described hereinbefore, the step 0222 is basically the same as the step 032 described hereinbefore, the step 0223 is basically the same as the step 033 described hereinbefore, the step 0224 is basically the same as the step 0184 described hereinbefore, the step 0225 is basically the same as the step 0185 described hereinbefore, the steps 02261 and 02262 may be sub-steps of the step 0186 described hereinbefore; and the steps 02261 and 02262 may be implemented by the processor 20. That is, the processor 20 may be further configured to calculate the third image according to the first image and the second image, and calculate the depth image according to the third image and the reference image. The difference between the collection time of the first image and the collection time of the second image is less than the preset value.

In the calculation of the depth image, the processor 20 may first distinguish the first images from the second images, and then select the second image of any frame and the first image of a specific frame corresponding to the second image of the any frame according to the collection time, and the difference between the collection time of the first image of the specific frame and the collection time of the second image of the any frame is less than the preset value. Subsequently, the processor 20 calculates the third image according to the first image of the specific frame and the second image of the any frame, and the third image is a collection image formed by only the infrared laser emitted by the laser projector 14, which may also be referred to as an actual speckle image. Specifically, there is a one-to-one correspondence between a plurality of pixels in the first image and a plurality of pixels in the second image. Assuming that the first image is represented by P1, the second image is represented by P2, and the third image is represented by P3, the processor 20 may subtract a pixel value of a pixel $P1_{i,j}$ in the first image from a pixel value of a pixel $P2_{i,j}$ in the second image to obtain a pixel value of a pixel $P3_{i,j}$ in the third image, i.e., $P3_{i,j}=P2_{i,j}-P1_{i,j}$, $i \in N+$, $j \in N+$. Subsequently, the processor 20 may calculate the depth image according to the third image and the reference image. It should be noted that the number of frames of the second images, the number of frames of the third images, and the number of frames of the depth images are equal. It will be understood that since the difference between the collection time of the first image and the collection time of the second image is small, the intensity of the ambient infrared light in the first image is closer to that of the ambient infrared light in the second image, the accuracy of the third image calculated according to the first image and the second image is higher, which further reduces the influence of the ambient infrared light on the acquisition of the depth image.

In some embodiments, the processor 20 may also add an image type to the third image and the depth image, so as to distinguish data streams obtained after processing the collection images. As shown in table 2:

TABLE 2

| stream | stream_type | light |
|---|---|---|
| 0 | 1 | 1 |
| 1 | X | X |

As illustrated in Table 2, when the stream is 0, it means that the data stream at this time is an image formed by the infrared light and/or the infrared laser, when the stream is 1, it means that the data stream at this time is the depth image. When the light is 11, it means background subtraction, i.e., removing a part of the collection image formed by the ambient infrared light, then the processor 20 may add a stream_type 011 to the data stream after the background subtraction to identify this data stream as the third image. When the light is XX, where X indicates an unlimited value, the processor 20 may add a stream_type 1XX to the data stream obtained after depth calculation to identify this data stream as the depth image.

In some embodiments, in the first image and the second image that participate in the calculation of the depth image, the collection time of the first image may be either before or after the collection time of the second image, which will not be limited herein.

In some embodiments, when the difference between the collection time of the first image and the collection time of the second image is less than the preset value, the first image and the second image may be images of adjacent frames or images of non-adjacent frames. For example, when the second operating frequency is twice the first operating frequency, the first image and the second image whose collection time difference is less than the preset value are images of adjacent frames; when the second operating frequency is more than twice the first operating frequency, for example, the second operating frequency is three times the first operating frequency, the first image and the second image whose collection time difference is less than the preset value may be images of adjacent frames or images of non-adjacent frames (in this case, there is still a frame of first image between the first image and the second image).

In some embodiments, there may be several frames of first images participating in the calculation of the depth image. For example, when the second operating frequency is three times the first operating frequency, two adjacent frames of first images and one frame of second image adjacent to the two frames of first images may be selected to calculate the third image. In this case, the processor 20 may first perform fusion processing on the two frames of first images, for example, add pixel values of corresponding pixels of the two frames of first images and then take the average value to obtain a fusion processed first image, and then calculate the third image using the fusion processed first image and the one frame of second image adjacent to the two frames of first images.

In some embodiments, the processor 20 may calculate multiple frames of third image, such as the $[(N+1)-N]^{th}$ frame of third image, the $[(N+3)-(N+2)]^{th}$ frame of third image, the $[(N+5)-(N+4)]^{th}$ frame of third image, etc., as illustrated in FIG. 19, and calculate multiple frames of depth images corresponding to the multiple frames of third image. Of course, in other embodiments, it is also possible that the processor 20 only calculates one frame of third image, and calculates one frame of depth image corresponding to the one frame of third image. The number of frames of the third image may be determined according to a security level of an application scene. Specifically, when the application scene requires a high security level, such as a payment scene, more frames of third images should be calculated, in this case, a payment action will be executed only when multiple frames of depth images are all successfully matched with a depth template of the user, so as to improve the security of payment; while for application scenes requiring a low security level, such as an application scene for portrait beautification based on depth information, less frames of third images are required, such as one frame of third image, in this case, one frame of depth image is enough for performing the portrait beautification. In this way, the calculation amount and power consumption of the processor 20 may be reduced, and the image processing speed may be increased.

Figure 23:
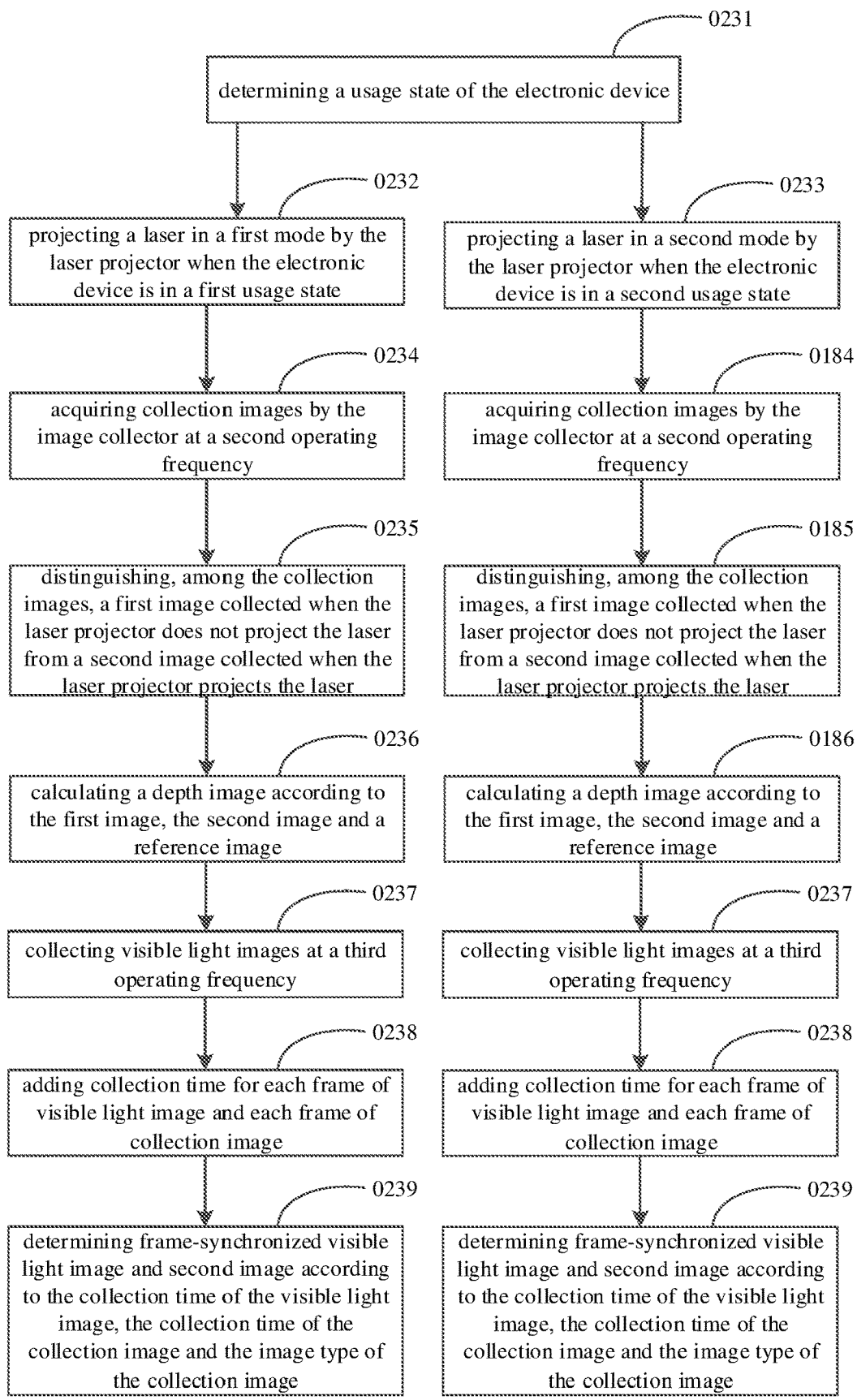
FIG. 23 is a schematic flow chart of a controlling method for an electronic device according to some embodiments of the present disclosure.

As illustrated in FIG. 1 and FIG. 23, in some embodiments, the controlling method further includes:
 0237, collecting visible light images at a third operating frequency, the third operating frequency being greater than or less than the second operating frequency;
 0238, adding collection time for each frame of visible light image and each frame of collection image; and
 0239, determining frame-synchronized visible light image and second image according to the collection time of the visible light image, the collection time of the collection image and the image type of the collection image.

That is, the controlling method includes:
 0231, determining a usage state of the electronic device 100;
 0232, projecting a laser in a first mode by the laser projector 14 when the electronic device 100 is in a first usage state;
 0233, projecting a laser in a second mode by the laser projector 14 when the electronic device 100 is in a second usage state, the laser projected in the second mode having a greater energy than that of the laser projected in the first mode;
 0234, acquiring collection images by the image collector 15 at a second operating frequency, the second operating frequency being greater than first operating frequency;
 0235, distinguishing, among the collection images, a first image collected when the laser projector 14 does not project the laser from a second image collected when the laser projector 14 projects the laser;
 0236, calculating a depth image according to the first image, the second image and a reference image;
 0237, collecting visible light images at a third operating frequency, the third operating frequency being greater than or less than the second operating frequency;
 0238, adding collection time for each frame of visible light image and each frame of collection image; and
 0239, determining frame-synchronized visible light image and second image according to the collection time of the visible light image, the collection time of the collection image and the image type of the collection image.

The above controlling method may also be implemented by the electronic device 100, in which the step 0231 is basically the same as the step 031 described hereinbefore, the step 0232 is basically the same as the step 032 described hereinbefore, the step 0233 is basically the same as the step 033 described hereinbefore, the step 0234 is basically the same as the step 0184 described hereinbefore, the step 0235 is basically the same as the step 0185 described hereinbefore, the step 0236 is basically the same as the step 0186 described hereinbefore; and the step 0237 may be implemented by the visible light camera 40 (any one of the primary camera 41 and the secondary camera, or the primary camera 41 and the secondary camera 42 together). The steps 0238 and 0239 may be implemented by the processor 20. In other words, the visible light camera 40 may be configured to collect the visible light images at the third operating frequency, and the third operating frequency is greater than or less than the second operating frequency. The processor 20 may be configured to add the collection time for each frame of visible light image and each frame of collection image, and determine the frame-synchronized visible light image and second image according to the collection time of the visible light image, the collection time of the collection image and the image type of the collection image.

In some application scenes, for example, in an application scene for 3D modeling an object in the scene, the image collector 15 is used to obtain depth information of the object in the scene, and the visible light camera 40 is used to obtain color information of the object in the scene, so as to realize the 3D modeling. In this case, the processor 20 needs to turn on the image collector 15 to obtain the depth image and simultaneously turn on the visible light camera 40 to obtain the visible light image.

If the image collector 15 and the visible light camera 40 have the same operating frequency, that is, the image collector 15 and the visible light camera 40 both work at the second operating frequency, then the processor 20 may send an image collection instruction to the image collector 15 via the I2C bus, after receiving the image collection instruction, the image collector 15 is synchronized with the visible light camera 40 through a sync signal, which controls the visible light camera 40 to collect the visible light image, so as to realize hardware synchronization between the image collector 15 and the visible light camera 40. In this case, the number of frames of collection images is consistent with the number of frames of visible light images, and there is a one-to-one correspondence between the collection images and the visible light images.

However, when the operating frequency of the image collector 15 is different from that of the visible light camera 40, that is, the image collector 15 works at the second operating frequency, while the visible light camera 40 works at a third operating frequency that is not equal to the second operating frequency, the image collector 15 and the visible light camera 40 cannot achieve the hardware synchronization. In this case, the processor 20 needs to achieve the synchronization between the image collector 15 and the visible light camera 40 through software synchronization. Specifically, the processor 20 sends an image collection instruction to the image collector 15 through an I2C bus connected to the image collector 15, and at the same time sends an image collection instruction to the visible light camera 40 through an I2C bus connected to the visible light camera 40. Each time the processor 20 receives a frame of collection image, the processor 20 will add the image type and the collection time to the collection image. In addition, each time the processor 20 receives a frame of visible light image, the processor 20 will add the collection time to the visible light image. The collection time of the collection image may be start time or end time each time the image collector 15 collect the collection image, or any time between the start time and the end time; and the collection time of the visible light image may be start time or end time each time the visible light camera 40 collect the visible light image, or any time between the start time and the end time. Then, in the subsequent processing (such as 3D modeling, and portrait beautifying in virtue of the depth information, etc.) based on the depth image and the visible light image, the processor 20 may first determine the frame-synchronized visible light image and second image according to the collection time of the visible light image, the collection time of the collection image and the type of the collection image. It should be noted that frame-synchronization indicates that the collection time difference between the determined second image and visible light image is less than the preset value, and the collection time of the visible light image may be either before or after the collection time of the second image. Subsequently, the processor 20 selects the first image according to the determined second image to further calculate the depth image according to the second image, the first image and the reference image. Finally, the processor 20 performs subsequent processing based on the depth image and the determined visible light image.

In some embodiments, the processor 20 may also add collection time to each frame of depth image, and then determine the frame-synchronized visible light image and depth image according to the collection time of the visible light image and the collection time of the depth image, and finally perform subsequent processing on the frame-synchronized visible light image and depth image. The collection time of each frame of depth image is the collection time of the second image corresponding to this frame of depth image.

Figure 24:
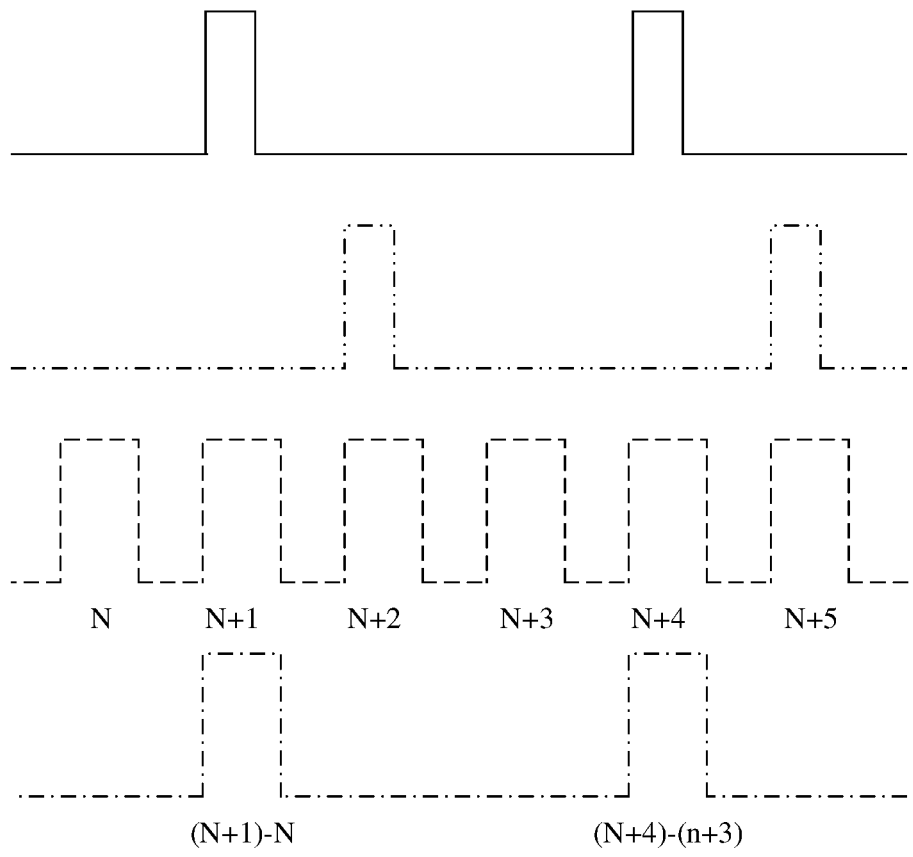
FIG. 24 is a schematic diagram illustrating a principle of a controlling method for an electronic device according to some embodiments of the present disclosure.

As illustrated in FIG. 24, in some embodiments, the collection image also includes an infrared image, and the infrared image is an image formed by infrared light emitted by the floodlight 50 and collected by image collector 15. When the processor 20 adds the image type to each frame of collection image, the processor 20 also adds an image type to the infrared image. In an example, the image type of the infrared images is shown in Table 3.

TABLE 3

| stream_type | |
|---|---|
| stream | light |
| 0 | 1 | 0 |

In Table 3, when the stream is 0, it means that the data stream at this time is an image formed by infrared light and/or infrared laser. When the light is 10, it means that the data stream at this time is obtained in the case that the floodlight 50 projects infrared light and the laser projector 14 does not project a laser. Then, when the processor 20 adds the stream_type 010 to a frame of collection image, it identifies that this frame of collection image is an infrared image.

In some application scenes, such as in identity verification based on both the matching of the depth image with a depth template and the matching of the infrared image with an infrared template, the image collector 15 needs to be cooperated with the floodlight 50 and the laser projector 14, and the image collector 15 obtains the first image, the second image and the infrared image in a time-sharing manner. As illustrated in FIG. 24, a solid line represents laser emitting timing of the laser projector 14, a double-dot dash line represents infrared light emitting timing of the floodlight 50, a dashed line represents timing of the image collector 15 for acquiring the collection images and the number of frames of the collection images, and a dot dash line represents the number of frames of the third images obtained according to the first image and the second image, and these four kinds of lines, i.e., the solid line, the double-dot dash line, the dashed line and the dot dash line are shown in this order from top to bottom in FIG. 24, the second operating frequency is three times the first operating frequency, and the second operating frequency is three times a fourth operating frequency. The processor 20 may monitor the operating state of the floodlight 50 in real time via the I2C bus. Each time the processor 20 receives a frame of collection image from the image collector 15, the processor 20 will first acquire the collection time of the collection image, and then determine according to the collection time of the collection image whether the floodlight 50 emits infrared light or not during the collection time of the collection image, and add the image type to the collection image based on the judgment result. Subsequently, the processor 20 may determine the infrared image and the second image whose collection time difference is less than the preset value based on the collection time of the infrared images and the collection time of the second images. Further, the processor 20 may determine the infrared image and the depth image, and use the infrared image and the depth image for identity verification.

Figure 25:
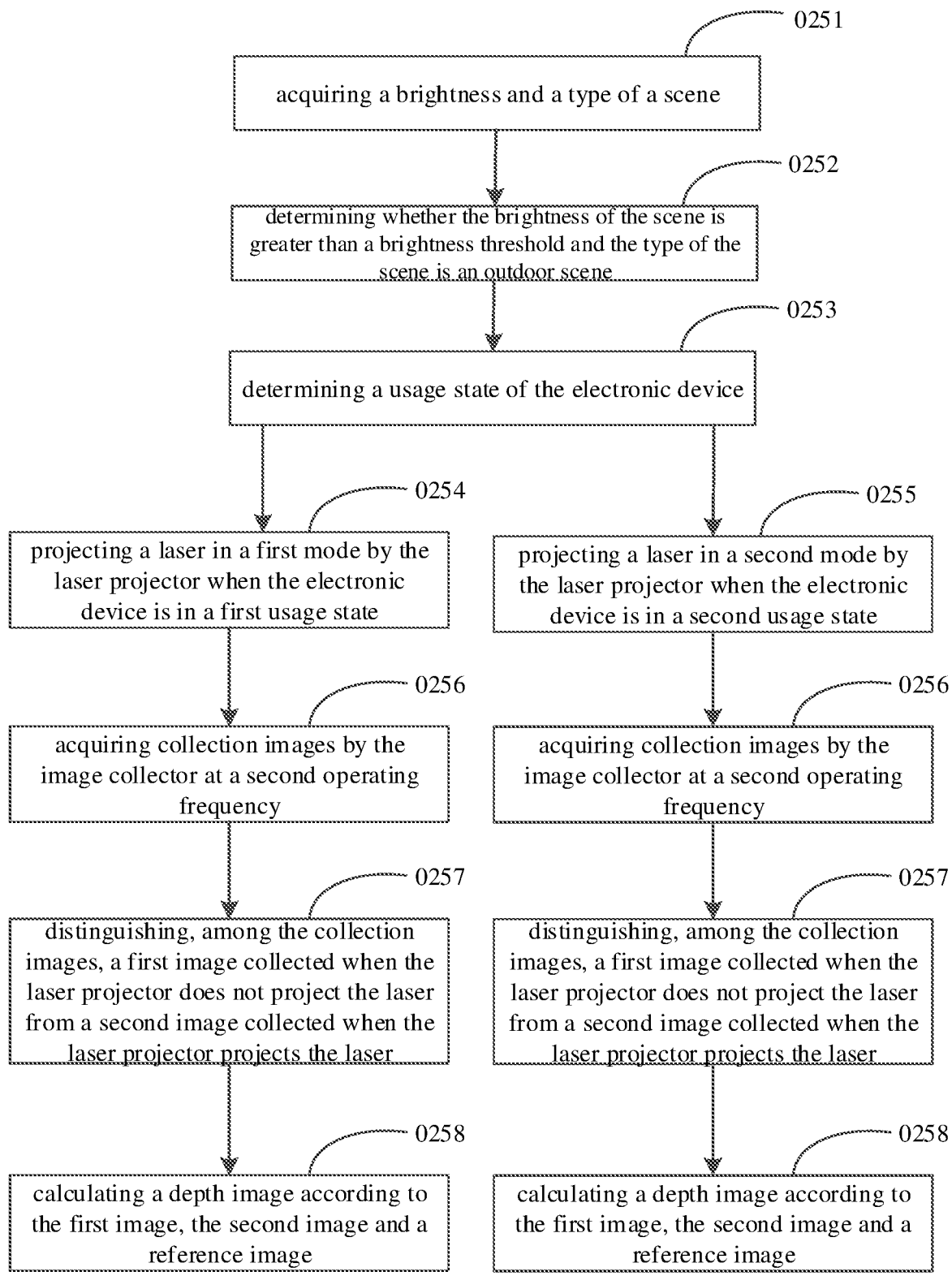
FIG. 25 is a schematic flow chart of a controlling method for an electronic device according to some embodiments of the present disclosure.

As illustrated in FIG. 1 and FIG. 25, in some embodiments, the controlling method further includes:

0251, acquiring a brightness and a type of a scene;
0252, determining whether the brightness of the scene is greater than a brightness threshold and the type of the scene is an outdoor scene;
if the brightness of the scene is greater than the brightness threshold and the type of the scene is the outdoor scene, entering a step of determining a usage state of the electronic device 100 (step 0253).

That is, the controlling method includes:
0251, acquiring a brightness and a type of a scene;
0252, determining whether the brightness of the scene is greater than a brightness threshold and the type of the scene is an outdoor scene;
0253, if the brightness of the scene is greater than the brightness threshold and the type of the scene is the outdoor scene, determining a usage state of the electronic device 100;
0254, projecting a laser in a first mode by the laser projector 14 when the electronic device 100 is in a first usage state;
0255, projecting a laser in a second mode by the laser projector 14 when the electronic device 100 is in a second usage state, the laser projected in the second mode having a greater energy than that of the laser projected in the first mode;
0256, acquiring collection images by the image collector 15 at a second operating frequency, the second operating frequency being greater than first operating frequency;
0257, distinguishing, among the collection images, a first image collected when the laser projector 14 does not project the laser from a second image collected when the laser projector 14 projects the laser; and
0258, calculating a depth image according to the first image, the second image and a reference image.

The above controlling method may also be implemented by the electronic device 100, in which the step 0253 is basically the same as the step 031 described hereinbefore, the step 0254 is basically the same as the step 032 described hereinbefore, the step 0255 is basically the same as the step 033 described hereinbefore, the step 0256 is basically the same as the step 0184 described hereinbefore, the step 0257 is basically the same as the step 0185 described hereinbefore, the step 0258 is basically the same as the step 0186 described hereinbefore; and both the steps 0251 and 0252 may be implemented by the processor 20. That is, the processor 20 may be configured to acquire the brightness and the type of the scene, and determine whether the brightness of the scene is greater than the brightness threshold and determine that the type of the scene is the outdoor scene. The laser projector 14 may be configured to project a laser to the scene at the first operating frequency when the brightness of the scene is greater than the brightness threshold and the type of the scene is the outdoor scene.

Specifically, the brightness of the scene may be obtained by analyzing the collection image acquired by the image collector 15 or the visible light image acquired by the visible light camera 40 (any one of the primary camera 41 and the secondary camera 42, or the primary camera 41 and the secondary camera 42 together). Alternatively, the brightness of the scene may also be directly detected by a light sensor, and the processor 20 reads a detected signal from the light sensor to obtain the brightness of the scene. The type of the scene may be obtained by analyzing the collection image acquired by the image collector 15 or the visible light image acquired by the visible light camera 40, for example, analyzing the collection image or the object in the visible light image obtained by the visible light camera 40 to determine whether the type of the scene is an outdoor scene or an indoor scene; and the type of the scene may also be determined directly according to a geographic location. Specifically, the processor 20 may acquire a positioning results of the scene by the global positioning system, and then further determine the type of the scene according to the positioning result, for example, if the positioning result shows a certain office building, it indicates that the scene is an indoor scene; if the positioning result shows a certain park, it indicates that the scene is an outdoor scene; if the positioning result shows a certain street, it indicates that the scene is an outdoor scene, and so on.

It will be understood that when the brightness of the scene is high (for example, the brightness is greater than the brightness threshold), the proportion of the ambient infrared light in the collection image is larger, which has a greater impact on speckle recognition. In this case, the interference of the ambient infrared light needs to be removed. However, when the brightness of the scene is low, the proportion of the ambient infrared light in the collection image is less, and the impact on the speckle recognition is small and may be ignored. In this case, the image collector 15 and the laser projector 14 can work at the same operating frequency, and the processor 20 calculates the depth image directly according to the collection image (i.e., the second image) acquired by the image collector 15 and the reference image. In addition, the high brightness of the scene may be caused by strong light of an indoor lamp, since the light of the lamp does not include infrared light, it will not generate a significant impact on the speckle recognition. In this case, the image collector 15 and the laser projector 14 work at the same operating frequency, and the processor 20 calculates the depth image directly according to the collection image (i.e., the second image) acquired by the image collector 15 and the reference image. In this way, the operating frequency and the power consumption of the image collector 15 are reduced.

Of course, in some embodiments, the controlling method may also determine whether to perform the step 0253 based only on the brightness of the scene. Specifically, the processor 20 only acquires the brightness of the scene and determines whether the brightness of the scene is greater than the brightness threshold, and the laser projector 14 projects a laser to the scene at the first operating frequency when the brightness is greater than the brightness threshold.

In some embodiments, the processor 20 may also add status information (status) to each data stream. In an example, as shown in Table 4:

TABLE 4

| stream_type | | status |
|---|---|---|
| stream | light | valid |
| 0 | 0 | 0 | 0 |
| 0 | 0 | 1 | 0 |
| 0 | 1 | 0 | 0 |
| 0 | 1 | 1 | 1 |
| 1 | X | X | 1 |
| 1 | X | X | 0 |

When the status is 0, it means that the data stream does not undergo background subtraction, and when the status is 1, it means that the data stream has undergone the background subtraction. In Table 4, 0000 means the first image; 0010 means the second image; 0100 means the infrared image acquired by the image collector 15 when the floodlight 50 is turned on; 0111 means the third image; 1XX1 means the depth image after the background subtraction; 1XX0 means the depth image without the background subtraction. In this way, the status information is added to each data stream, so that the processor 20 can distinguish whether individual data streams undergo the background subtraction.

In some embodiments, the processor 20 includes a first storage area, a second storage area, and a logical subtraction circuit, and the logical subtraction circuit is connected to both the first storage area and the second storage area. The first storage area is configured to store the first image, the second storage area is configured to store the second image, and the logical subtraction circuit is configured to process the first image and the second image to obtain the third image. Specifically, the logical subtraction circuit reads the first image from the first storage area, reads the second image from the second storage area, and performs subtraction processing on the first image and the second image to obtain the third image after acquiring the first image and the second image. The logic subtraction circuit is also connected to a depth calculation module (for example, it may be an application specific integrated circuit (ASIC) specifically used to calculate the depth) in the processor 20, and the logic subtraction circuit sends the third image to the depth calculation module, and the depth calculation module calculates the depth image according to the third image and the reference image.

Reference throughout this specification to "an embodiment," "some embodiments," "schematic embodiment," "one example," "an example," "a specific example," or "some examples," means that a particular feature, structure, material, or characteristic described in connection with the embodiment or example is included in at least one embodiment or example of the present disclosure. Thus, the appearances of these phrases in various places throughout this specification are not necessarily referring to the same embodiment or example of the present disclosure. Furthermore, the described particular features, structures, materials, or characteristics may be combined in any suitable manner in one or more embodiments or examples. In addition, in the absence of contradiction, different embodiments or examples described in this specification or the features of different embodiments or examples may be combined by those skilled in the art.

Any process or method described in a flow chart or described herein in other ways may be understood to represent a module, segment, or portion of code that includes one or more executable instructions to implement specified logic function(s) or that includes one or more executable instructions of the steps in the process, and the scope of a preferred embodiment of the present disclosure includes other implementations, in which the order of execution is different from what is shown or discussed, including executing functions in a substantially simultaneous manner or in an opposite order according to the related functions, which shall be understood by those skilled in the art to which the embodiments of the present disclosure belong.

Although embodiments have been shown and described above, it would be appreciated that the above embodiments are explanatory, which cannot be construed to limit the present disclosure, and changes, modifications, alternatives and variants can be made in the embodiments by those skilled in the art within the scope of the present disclosure.

What is claimed is:

1. A controlling method for an electronic device, wherein the electronic device comprises a shell, a first display screen, a second display screen and a laser projector, the shell comprises a first surface and a second surface opposite to each other, the first display screen and the second display screen are disposed on the first surface and the second surface, respectively, and the laser projector is disposed at the first surface;

wherein the controlling method comprises:
   determining a usage state of the electronic device;
   projecting a laser in a first mode by the laser projector when the electronic device is in a first usage state; and
   projecting a laser in a second mode by the laser projector when the electronic device is in a second usage state,
   wherein the laser projected in the second mode has a greater energy than that of the laser projected in the first mode.

2. The controlling method according to claim 1, wherein the electronic device further comprises a gravity sensor, and the determining the usage state of the electronic device comprises:
   determining the usage state of the electronic device by the gravity sensor.

3. The controlling method according to claim 2, wherein the determining the usage state of the electronic device by the gravity sensor comprises:
   acquiring a z-axis acceleration component of the gravity sensor;
   determining that the electronic device is in the first usage state when the z-axis acceleration component is greater than a first preset value; and
   determining that the electronic device is in the second usage state when the z-axis acceleration component is less than a second preset value.

4. The controlling method according to claim 1, wherein the determining the usage state of the electronic device comprises:
   determining the usage state of the electronic device according to any one or both of detection of a first touch signal by the first display screen and detection of a second touch signal by the second display screen.

5. The controlling method according to claim 4, wherein the determining the usage state of the electronic device according to any one or both of the detection of the first touch signal by the first display screen and the detection of the second touch signal by the second display screen comprises:
   determining that the electronic device is in the first usage state when the first touch signal is detected by the first display screen; and
   determining that the electronic device is in the second usage state when the second touch signal is detected by the second display screen.

6. The controlling method according to claim 1, wherein the electronic device further comprises a state selection key, and the determining the usage state of the electronic device comprises:
   determining the usage state of the electronic device through the state selection key.

7. The controlling method according to claim 1, wherein a power of the laser projector for projecting the laser in the first mode is less than that of the laser projector for projecting the laser in the second mode; or
   the laser projector comprises a plurality of point light sources each controlled independently; and the number of the point light sources turned on by the laser projector in the first mode is less than that of the point light sources turned on by the laser projector in the second mode.

8. The controlling method according to claim 1, wherein the electronic device further comprises an image collector disposed at the first surface; and when the laser projector projects a laser, the laser projector projects the laser at a first operating frequency to a scene;

wherein the controlling method further comprises:
acquiring collection images by the image collector at a second operating frequency, the second operating frequency being greater than first operating frequency;
distinguishing, among the collection images, a first image collected when the laser projector does not project the laser from a second image collected when the laser projector projects the laser; and
calculating a depth image according to the first image, the second image and a reference image.

9. An electronic device, comprising:
a shell, comprising a first surface and a second surface opposite to each other,
a first display screen and a second display screen, disposed on the first surface and the second surface, respectively,
a laser projector, disposed at the first surface, and
a processor, configured to determine a usage state of the electronic device,
wherein the laser projector is configured to project a laser in a first mode when the electronic device is in a first usage state and project a laser in a second mode when the electronic device is in a second usage state, wherein the laser projected in the second mode has a greater energy than that of the laser projected in the first mode.

10. The electronic device according to claim 9, wherein the electronic device further comprises a gravity sensor, and the processor is configured to determine the usage state of the electronic device by the gravity sensor.

11. The electronic device according to claim 10, wherein the processor is further configured to:
acquire a z-axis acceleration component of the gravity sensor;
determine that the electronic device is in the first usage state when the z-axis acceleration component is greater than a first preset value; and
determine that the electronic device is in the second usage state when the z-axis acceleration component is less than a second preset value.

12. The electronic device according to claim 9, wherein the processor is configured to determine the usage state of the electronic device according to any one or both of detection of a first touch signal by the first display screen and detection of a second touch signal by the second display screen.

13. The electronic device according to claim 12, wherein the processor is configured to:

determine that the electronic device is in the first usage state when the first touch signal is detected by the first display screen; and
determine that the electronic device is in the second usage state when the second touch signal is detected by the second display screen.

14. The electronic device according to claim 12, wherein the first touch signal and the second touch signal are both a capacitive signal.

15. The electronic device according to claim 9, wherein the electronic device further comprises a state selection key, and the processor is configured to determine the usage state of the electronic device through the state selection key.

16. The electronic device according to claim 9, wherein a power of the laser projector for projecting the laser in the first mode is less than that of the laser projector for projecting the laser in the second mode; or
the laser projector comprises a plurality of point light sources each controlled independently; and the number of the point light sources turned on by the laser projector in the first mode is less than that of the point light sources turned on by the laser projector in the second mode.

17. The electronic device according to claim 16, wherein the plurality of the point light sources form a plurality of light emitting arrays arranged in an annular shape.

18. The electronic device according to claim 9, wherein the electronic device further comprises an image collector disposed at the first surface;
the laser projector is configured to project a laser at a first operating frequency to a scene when the laser projector projects the laser;
the image collector is configured to acquire collection images at a second operating frequency, and the second operating frequency is greater than first operating frequency; and
the processor is further configured to distinguish, among the collection images, a first image collected when the laser projector does not project the laser from a second image collected when the laser projector projects the laser; and to calculate a depth image according to the first image, the second image and a reference image.

19. The electronic device according to claim 9, wherein the first display screen has an opening at an end thereof, the second display screen is a full screen, and the laser projector is installed in the opening; or
the first display screen and the second display screen are both a full screen, and the laser projector is disposed below the first display screen.

20. The electronic device according to claim 9, wherein an orientation of the laser projector in the first usage state is opposite to that of the laser projector in the second usage state.

* * * * *